US012610120B2

(12) United States Patent
Hsu et al.

(10) Patent No.: US 12,610,120 B2
(45) Date of Patent: Apr. 21, 2026

(54) IMAGING LENS MODULE, CAMERA MODULE AND ELECTRONIC DEVICE HAVING A PLURALITY OF COLUMNAR STRUCTURES FOR REDUCING REFLECTION

(71) Applicant: LARGAN PRECISION CO., LTD., Taichung City (TW)

(72) Inventors: Chih-Wen Hsu, Taichung City (TW); Heng-Yi Su, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 34 days.

(21) Appl. No.: 18/897,327

(22) Filed: Sep. 26, 2024

(65) Prior Publication Data

US 2025/0119631 A1 Apr. 10, 2025

Related U.S. Application Data

(60) Provisional application No. 63/588,310, filed on Oct. 6, 2023.

(51) Int. Cl.
*H04N 5/335* (2011.01)
*H04N 23/55* (2023.01)

(52) U.S. Cl.
CPC .................................. *H04N 23/55* (2023.01)

(58) Field of Classification Search
CPC ...................................................... H04N 23/55
See application file for complete search history.

(56) References Cited

U.S. PATENT DOCUMENTS

| | | | | |
|---|---|---|---|---|
| 7,145,721 | B2 * | 12/2006 | Banish | .................. H10F 39/806 359/569 |
| 9,864,160 | B2 * | 1/2018 | Lin | ......................... G02B 7/021 |
| 10,684,450 | B2 * | 6/2020 | Tsai | ......................... G02B 7/021 |
| 11,485,052 | B2 | 11/2022 | Nagoya et al. | |
| 11,531,181 | B2 * | 12/2022 | Chou | ..................... G02B 7/022 |
| 11,693,205 | B2 * | 7/2023 | Tsai | ..................... G02B 13/001 359/819 |

(Continued)

FOREIGN PATENT DOCUMENTS

| | | |
|---|---|---|
| CN | 110780363 A | 2/2020 |
| CN | 111016160 A | 4/2020 |
| CN | 114415312 A | 4/2022 |

*Primary Examiner* — Gary C Vieaux
(74) *Attorney, Agent, or Firm* — McClure, Qualey & Rodack, LLP

(57) ABSTRACT

An imaging lens module has an image surface and includes an optical lens assembly, a plurality of monomer structures and a cover member. The optical lens assembly is disposed on an object side of the image surface and defines an optical axis. The optical lens assembly includes a light-blocking element, which includes a light-blocking portion. The light-blocking portion is disposed closer to the optical axis than a portion of the light-blocking element other than the light-blocking portion thereto. The monomer structures are disposed on the object side of the image surface, and each of the monomer structures is extended along a direction parallel to the optical axis. The cover member is disposed on an object side of the optical lens assembly, and the optical axis passes through the cover member. The monomer structures are disposed on the light-blocking portion of the light-blocking element.

19 Claims, 39 Drawing Sheets

(56) References Cited

U.S. PATENT DOCUMENTS

| | | | | |
|---|---|---|---|---|
| 11,899,269 B2* | 2/2024 | Lin | .................... | G02B 13/0045 |
| 2007/0159698 A1* | 7/2007 | Taguchi | ................. | C25D 11/02 |
| | | | | 359/586 |
| 2018/0292626 A1* | 10/2018 | Chou | ................... | G02B 13/003 |

* cited by examiner

10

110

140

12

13 z1

10

110

12

13

140

100

17

180

20

210

230

22

30

321

30

325

323

322

324

324

θ

510

50

50

IMAGING LENS MODULE, CAMERA MODULE AND ELECTRONIC DEVICE HAVING A PLURALITY OF COLUMNAR STRUCTURES FOR REDUCING REFLECTION

RELATED APPLICATIONS

This application claims priority to U.S. Provisional Application Ser. No. 63/588,310, filed Oct. 6, 2023, which is herein incorporated by reference.

BACKGROUND

Technical Field

The present disclosure relates to an imaging lens module, a camera module and an electronic device. More particularly, the present disclosure relates to a compact imaging lens module and a compact camera module applicable to a portable electronic device.

Description of Related Art

In recent years, portable electronic devices have developed rapidly. For embodiment, intelligent electronic devices and tablets have been filled in the lives of modern people, and camera modules mounted on the portable electronic devices have also prospered. However, as technology advances, the quality requirements of the electronic devices and the camera modules thereof are becoming higher and higher. Therefore, an imaging lens module, a camera module and an electronic device, which are simultaneously featured with compact sizes and the image quality, needs to be developed.

SUMMARY

According to one aspect of the present disclosure, an imaging lens module has an image surface and includes an optical lens assembly, a plurality of monomer structures and a cover member. The optical lens assembly is disposed on an object side of the image surface and defines an optical axis. The optical lens assembly includes a light-blocking element, which includes a light-blocking portion. The light-blocking portion is disposed closer to the optical axis than a portion of the light-blocking element other than the light-blocking portion thereto. The monomer structures are disposed on the object side of the image surface, and each of the monomer structures is extended along a direction parallel to the optical axis. The cover member is disposed on an object side of the optical lens assembly, and the optical axis passes through the cover member. The monomer structures are disposed on the light-blocking portion of the light-blocking element. When a length along the direction parallel to the optical axis of each of the monomer structures is D, and a spacing distance between adjacent two of the monomer structures is Dp, the following conditions are satisfied: 0.03 mm≤D<0.12 mm; and 0.02 mm≤Dp<0.095 mm.

According to another aspect of the present disclosure, a camera module includes the imaging lens module according to the foregoing aspect.

According to another aspect of the present disclosure, an electronic device includes the camera module according to the foregoing aspect.

According to another aspect of the present disclosure, an imaging lens module has an image surface and includes an optical lens assembly, a light-blocking element, a plurality of monomer structures and a cover member. The optical lens assembly is disposed on an object side of the image surface and defines an optical axis. The light-blocking element is disposed opposite to the optical lens assembly and includes a light-blocking portion, and the light-blocking portion is disposed closer to the optical axis than a portion of the light-blocking element other than the light-blocking portion thereto. The monomer structures are disposed on the object side of the image surface, and each of the monomer structures is extended along a direction parallel to the optical axis. The cover member is disposed on an object side of the optical lens assembly, and the optical axis passes through the cover member. The monomer structures are disposed on the light-blocking portion of the light-blocking element. When a length along the direction parallel to the optical axis of each of the monomer structures is D, and a spacing distance between adjacent two of the monomer structures is Dp, the following conditions are satisfied: 0.03 mm≤D<0.12 mm; and 0.02 mm≤Dp<0.095 mm.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
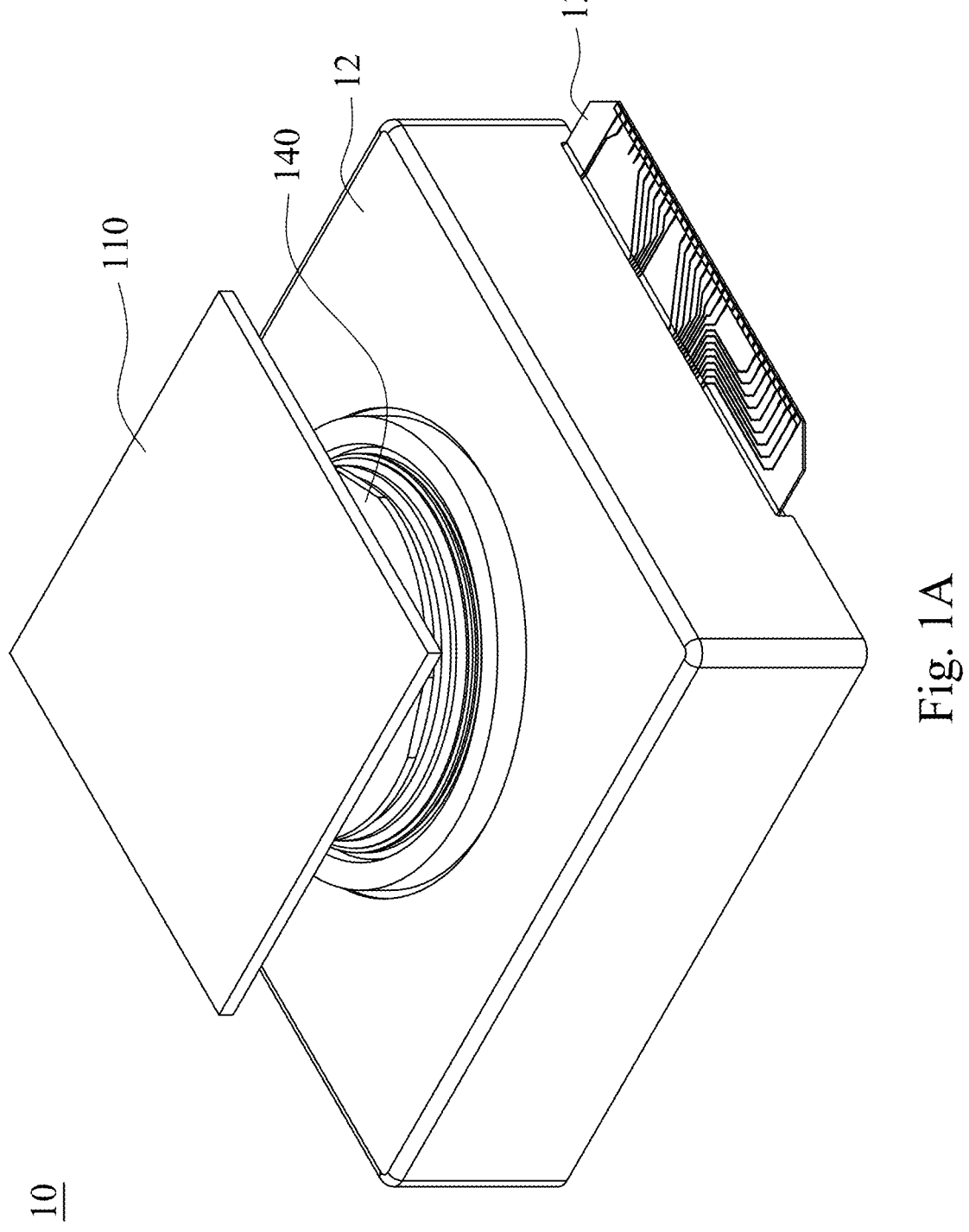
FIG. 1A is a three-dimensional view of a camera module according to the 1st embodiment of the present disclosure.

According to one aspect of the present disclosure, an imaging lens module is provided. The imaging lens module has an image surface and includes an optical lens assembly, a plurality of monomer structures and a cover member. The optical lens assembly is disposed on an object side of the image surface and defines an optical axis. The optical lens assembly includes a light-blocking element, which includes a light-blocking portion. The light-blocking portion is disposed closer to the optical axis than a portion of the light-blocking element other than the light-blocking portion to the optical axis. The monomer structures are disposed on the object side of the image surface, and each of the monomer structures is extended along a direction parallel to the optical axis. The cover member is disposed on an object side of the optical lens assembly, and the optical axis passes through the cover member. The monomer structures are disposed on the light-blocking portion of the light-blocking element. When a length along the direction parallel to the optical axis of each of the monomer structures is D, and a spacing distance between adjacent two of the monomer structures is Dp, the following conditions are satisfied: 0.03 mm≤D<0.12 mm; and 0.02 mm≤Dp<0.095 mm.

Furthermore, the 1st example to 5th example of the 1st embodiment of the present disclosure may be examples of the aforementioned imaging lens module. The monomer structures are extended along the direction parallel to the optical axis, one or more thereof may be in the form of a convex columnar structure that protrudes with a height from a disposing surface of the light-blocking portion, or one or more thereof may be in the form of a concave columnar structure that is recessed with a depth from the disposing surface of the light-blocking portion toward another surface, but is not limited thereto. The cover member may be made of a transparent plastic material or a transparent glass material, but is not limited thereto. The light-blocking element may be a lens barrel, a retainer, a spacer, a light-blocking sheet, etc., but is not limited thereto.

Moreover, in a miniaturized imaging lens module, the distance between the cover member and the light-blocking element is short, so that it probably causes unnecessary optical reflection (e.g., the dotted light paths in FIG. 1D and FIG. 8D), and the reflected light is flare. Therefore, the present disclosure is favorable for reducing the reflection ratio of light on the specific area by arranging the monomer structures on the specific area of the light-blocking portion via injection molding or laser beam processing.

According to one aspect of the present disclosure, an imaging lens module is provided. The imaging lens module has an image surface and includes an optical lens assembly, a light-blocking element, a plurality of monomer structures and a cover member. The optical lens assembly is disposed on an object side of the image surface and defines an optical axis. The light-blocking element is disposed opposite to the optical lens assembly and includes a light-blocking portion, and the light-blocking portion is disposed closer to the optical axis than a portion of the light-blocking element other than the light-blocking portion to the optical axis. The monomer structures are disposed on the object side of the image surface, and each of the monomer structures is extended along a direction parallel to the optical axis. The cover member is disposed on an object side of the optical lens assembly, and the optical axis passes through the cover member. The monomer structures are disposed on the light-blocking portion of the light-blocking element. When a length along the direction parallel to the optical axis of each of the monomer structures is D, and a spacing distance between adjacent two of the monomer structures is Dp, the following conditions are satisfied: 0.03 mm≤D<0.12 mm; and 0.02 mm≤Dp<0.095 mm. Therefore, the monomer structures can destroy the reflection path of non-imaging light to prevent non-imaging light from entering the optical lens assembly, so as to obtain a clear image.

Furthermore, the 2nd embodiment of the present disclosure may be examples of the aforementioned imaging lens module. The imaging lens module may further include a variable aperture module, which is disposed on the object side of the optical lens assembly, and the optical axis passes through the center of the variable aperture module. The variable aperture module includes at least two of the light-blocking elements. The light-blocking elements are stacked on each other along a circumferential direction of the optical axis to form a variable light aperture, and the disclosure is not limited thereto.

In detail, when a number of the monomer structures is Nm, the following condition may be satisfied: $250 < Nm < 25000$. Therefore, the design of the foregoing number range is favorable for obtaining a better light-blocking effect of the monomer structures.

The light-blocking portion may face the object side of the optical lens assembly. Therefore, the configuration helps the light-blocking portion to have better efficiency in intercepting the non-imaging light.

The light-blocking element may be extended along the direction parallel to the optical axis. The light-blocking element may further include an object-side surface, which is located at a most object-side portion of the light-blocking element. The object-side surface may face the object side of the optical lens assembly.

When a height difference along the direction parallel to the optical axis between the object-side surface and the disposing surface of the monomer structures is ΔH, and a length along the direction parallel to the optical axis of the light-blocking element is Lb, the following condition may be satisfied: $0 \leq \Delta H/Lb < 0.8$. Therefore, it ensures the continuity of coverage of the monomer structures to maintain high light-blocking effect.

The monomer structures may face the object side of the optical lens assembly. Therefore, the configuration helps the monomer structures to have better light-blocking effect.

The cover member may correspond to and face the light-blocking portion of the light-blocking element. Therefore, the configuration helps the light-blocking portion to have better efficiency in intercepting the non-imaging light.

The light-blocking element may be made of at least two structural layers. Specifically, the light-blocking element may be a light-blocking sheet, but is not limited thereto. The at least two structural layers may include a base layer and a covering layer.

When a thickness of the base layer is Ts, and a thickness of the covering layer is Tc, the following condition may be satisfied: $0.03 \text{ mm} \leq D < Ts+Tc < 0.5 \text{ mm}$. Therefore, the setting range is for a preferred thickness that is advantageous in the light-blocking effect of the monomer structures and the production efficiency of the light-blocking element.

Each of the aforementioned features of the imaging lens module according to the present disclosure can be utilized in various combinations for achieving the corresponding effects.

According to another aspect of the present disclosure, a camera module is provided, and the camera module includes the imaging lens module of the foregoing aspect.

According to another aspect of the present disclosure, an electronic device is provided, and the electronic device includes the camera module of the foregoing aspect.

According to the aforementioned aspects, specific embodiments are provided, and illustrated via figures.

1st Embodiment

Figure 1B:
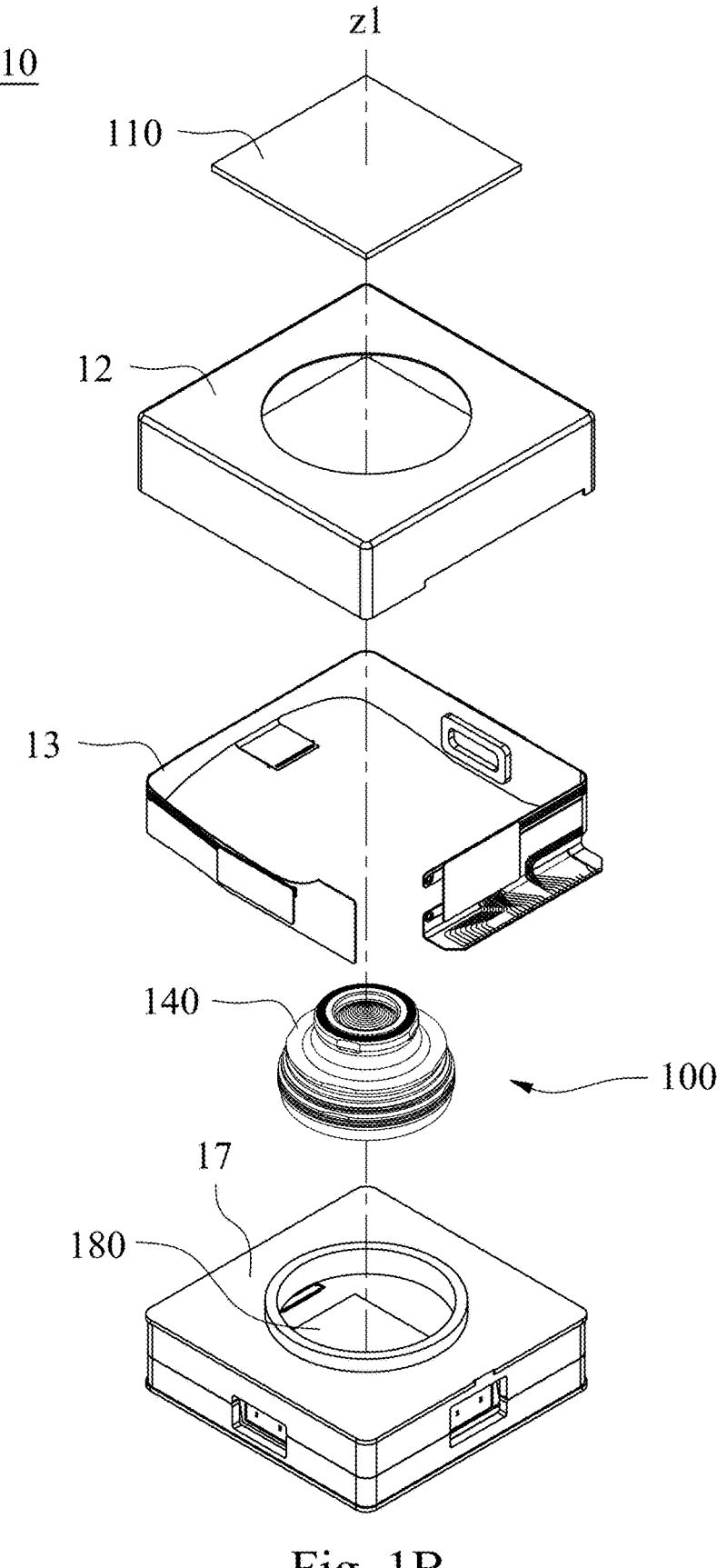
FIG. 1B is an exploded view of the camera module of the 1st embodiment in FIG. 1A.

FIG. 1A is a three-dimensional view of a camera module 10 according to the 1st embodiment of the present disclosure, and FIG. 1B is an exploded view of the camera module 10 of the 1st embodiment in FIG. 1A. With reference to FIG. 1A and FIG. 1B, the camera module 10 includes an imaging lens module 100. Specifically, the camera module 10 may further include a metal yoke 12, a circuit element 13 and a carrier 17.

Figure 1C:
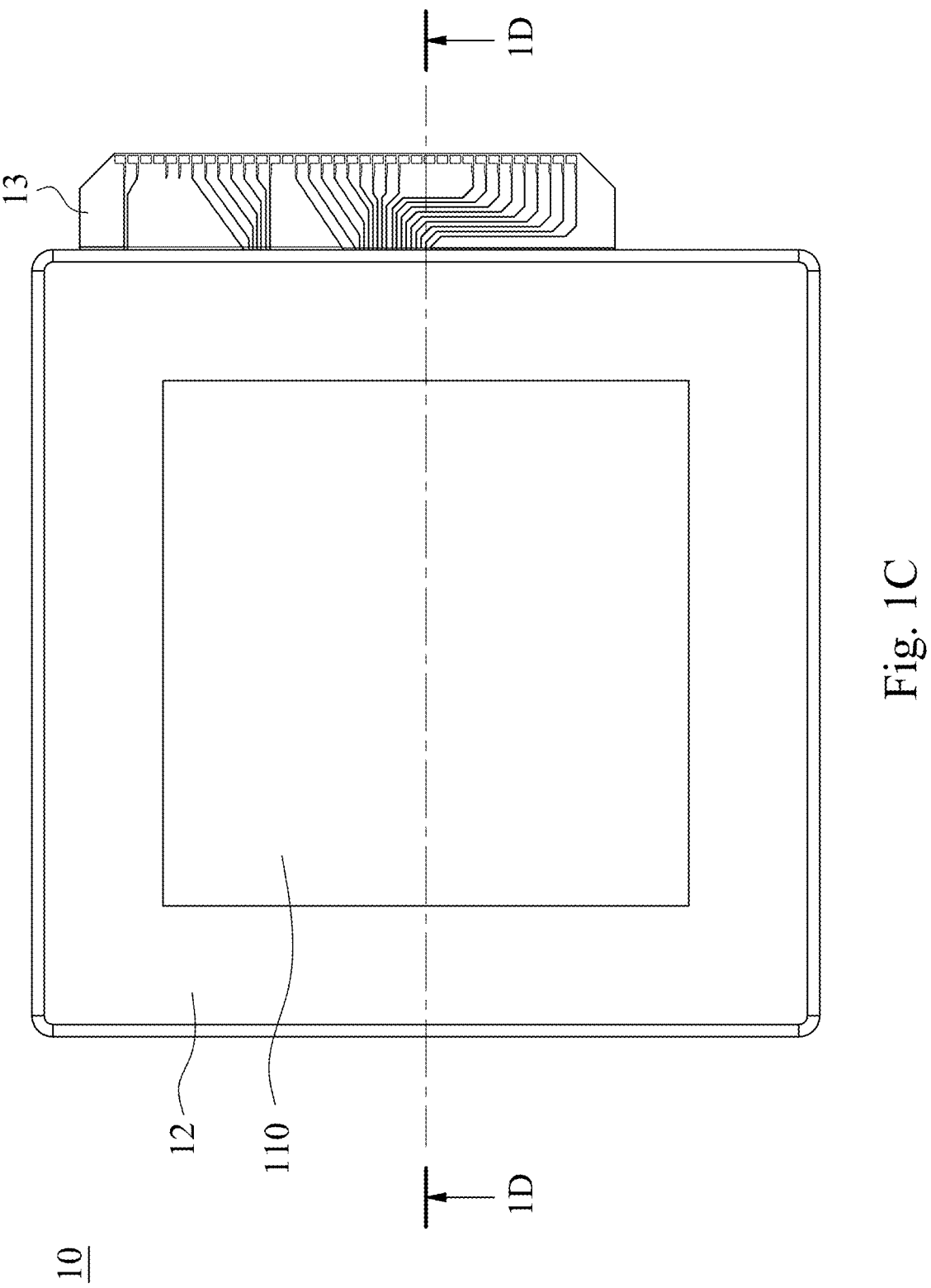
FIG. 1C is a top view of the camera module of the 1st embodiment in FIG. 1A.
Figure 1D:
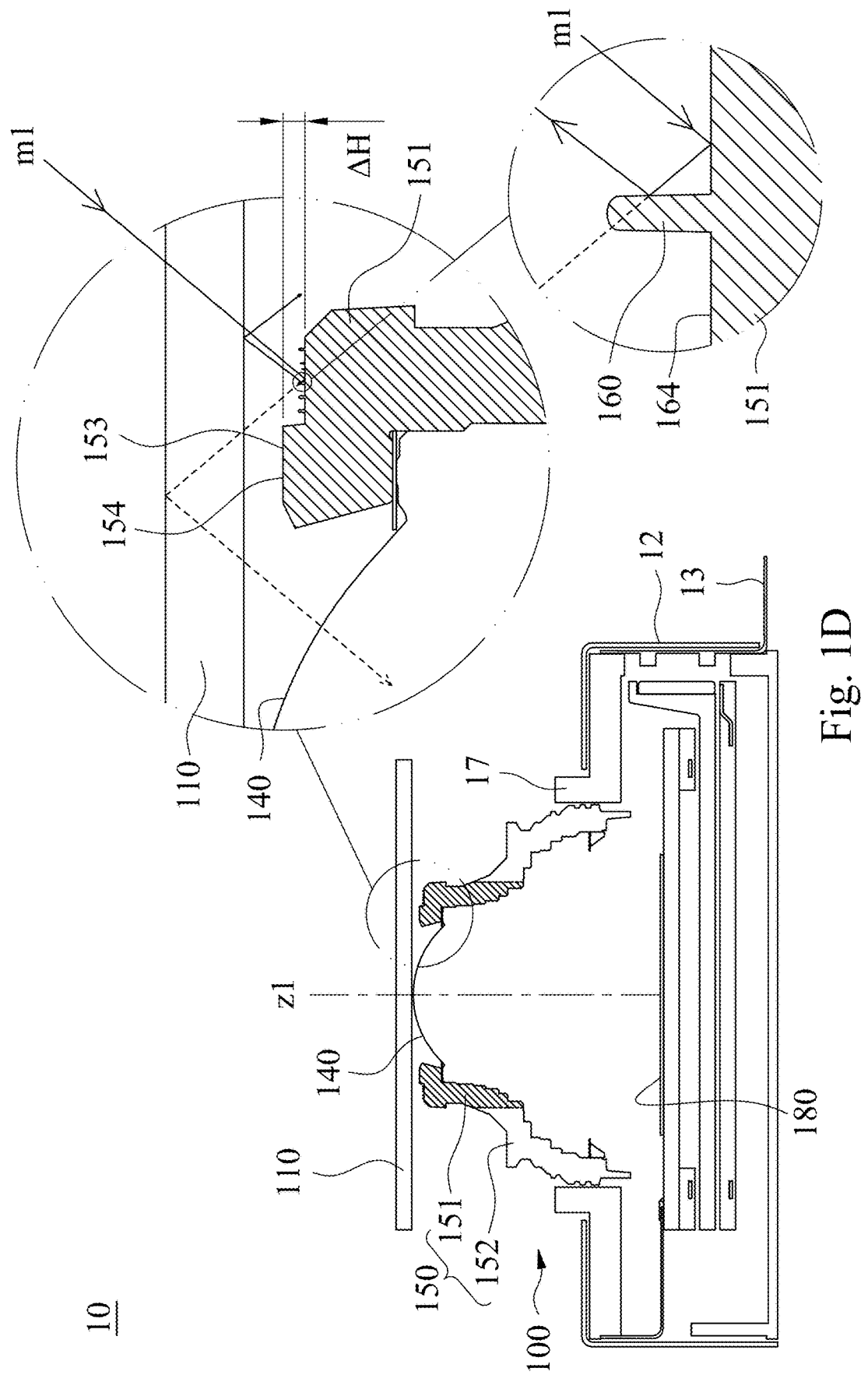
FIG. 1D is a cross-sectional view along line 1D-1D in FIG. 1C.
Figure 1E:
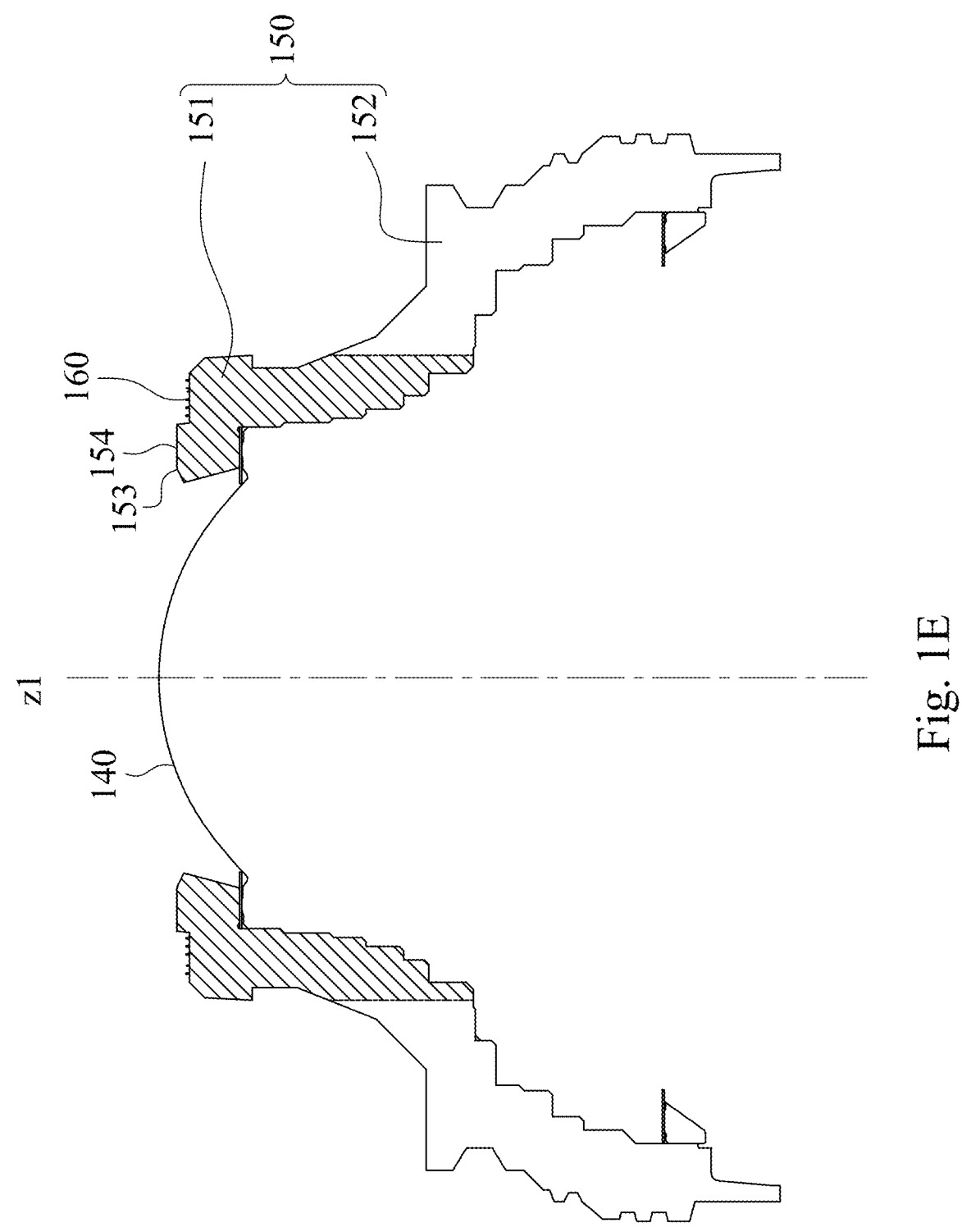
FIG. 1E is a schematic view of a light-blocking element in FIG. 1D.

FIG. 1C is a top view of the camera module 10 of the 1st embodiment in FIG. 1A, FIG. 1D is a cross-sectional view along line 1D-1D in FIG. 1C, and FIG. 1E is a schematic view of a light-blocking element 150 in FIG. 1D. With reference to FIG. 1A to FIG. 1E, the imaging lens module 100 has an image surface 180, and an image sensor (not labeled) is disposed on the image surface 180. The imaging lens module 100 includes an optical lens assembly 140, a plurality of monomer structures 160 and a cover member 110. The optical lens assembly 140 is disposed on an object side of the image surface 180 and defines an optical axis z1. The optical lens assembly 140 includes a light-blocking element 150, which specifically a lens barrel and includes a light-blocking portion 151. The light-blocking portion 151 is disposed closer to the optical axis z1 than a portion 152 of the light-blocking element 150 other than the light-blocking portion 151 to the optical axis z1. The monomer structures 160 are disposed on the object side of the image surface 180, and each of the monomer structures 160 is extended along a direction parallel to the optical axis z1. Each of the monomer structures 160 appears as a convex columnar structure protruding with a height from a disposing surface 164 of the light-blocking portion 151, or each of the monomer structures 160 appears as a concave columnar structure recessed with a depth from the disposing surface 164 of the light-blocking portion 151 toward another surface, but is not limited thereto. The cover member 110 is disposed on an object side of the optical lens assembly 140, and the optical axis z1 passes through the cover member 110. The monomer structures 160 are disposed on the light-blocking portion 151 of the light-blocking element 150. Therefore, by disposing the monomer structures 160 on a specific area of the light-blocking portion 151 through injection molding or laser beam processing, flare caused by unwanted optical reflections can be reduced. For example, in FIG. 1D, the incident light m1 is prevented from being reflected from the light-blocking portion 151 to the cover member 110 and then being reflected from the cover member 110 into of the lens elements of the optical lens assembly 140, as the light path shown by the dotted line, thereby reducing the reflection ratio of light on the specific area. In FIG. 1A, FIG. 1B, FIG. 1D and FIG. 1E, the object side refers to the upper side of the reference element in the figure, and the image side refers to the lower side of the reference element in the figure.

In detail, with reference to FIG. 1D, the light-blocking portion 151 may face the object side of the optical lens assembly 140. The light-blocking element 150 may be extended along the direction parallel to the optical axis z1. The light-blocking element 150 may further include an object-side surface 154, which is located at a most object-side portion 153 of the light-blocking element 150. The object-side surface 154 may face the object side of the optical lens assembly 140. Furthermore, the monomer structures 160 may face the object side of the optical lens assembly 140. The cover member 110 may correspond to and face the light-blocking portion 151 of the light-blocking element 150.

Multiple examples are described in the following for the details of various optical lens assemblies and light-blocking elements that can be applied in the camera module of the 1st embodiment of the present disclosure.

1st Example of 1st Embodiment

Figure 2A:
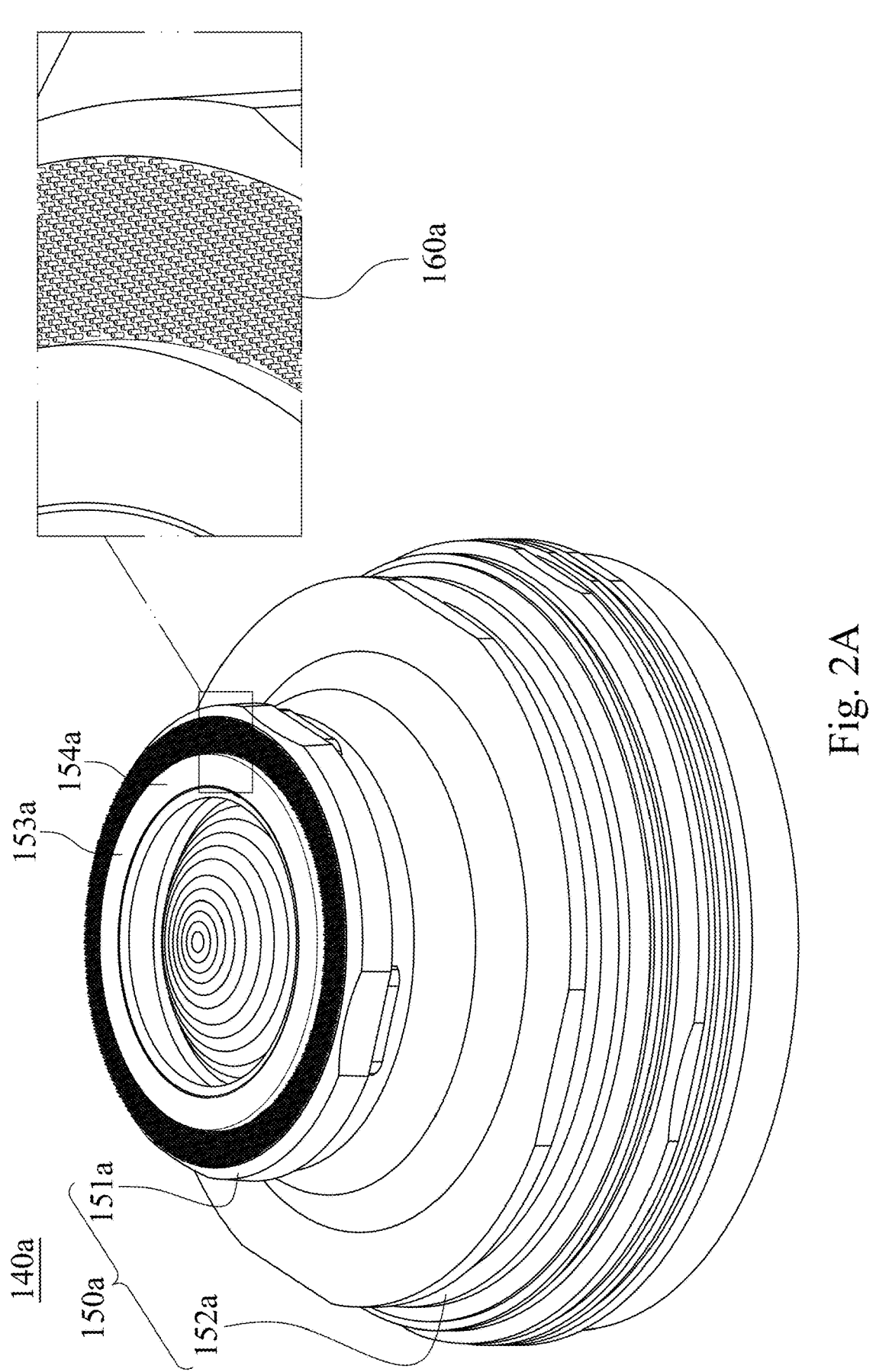
FIG. 2A is a three-dimensional view of an optical lens assembly according to the 1st example of the 1st embodiment of the present disclosure.
Figure 2B:
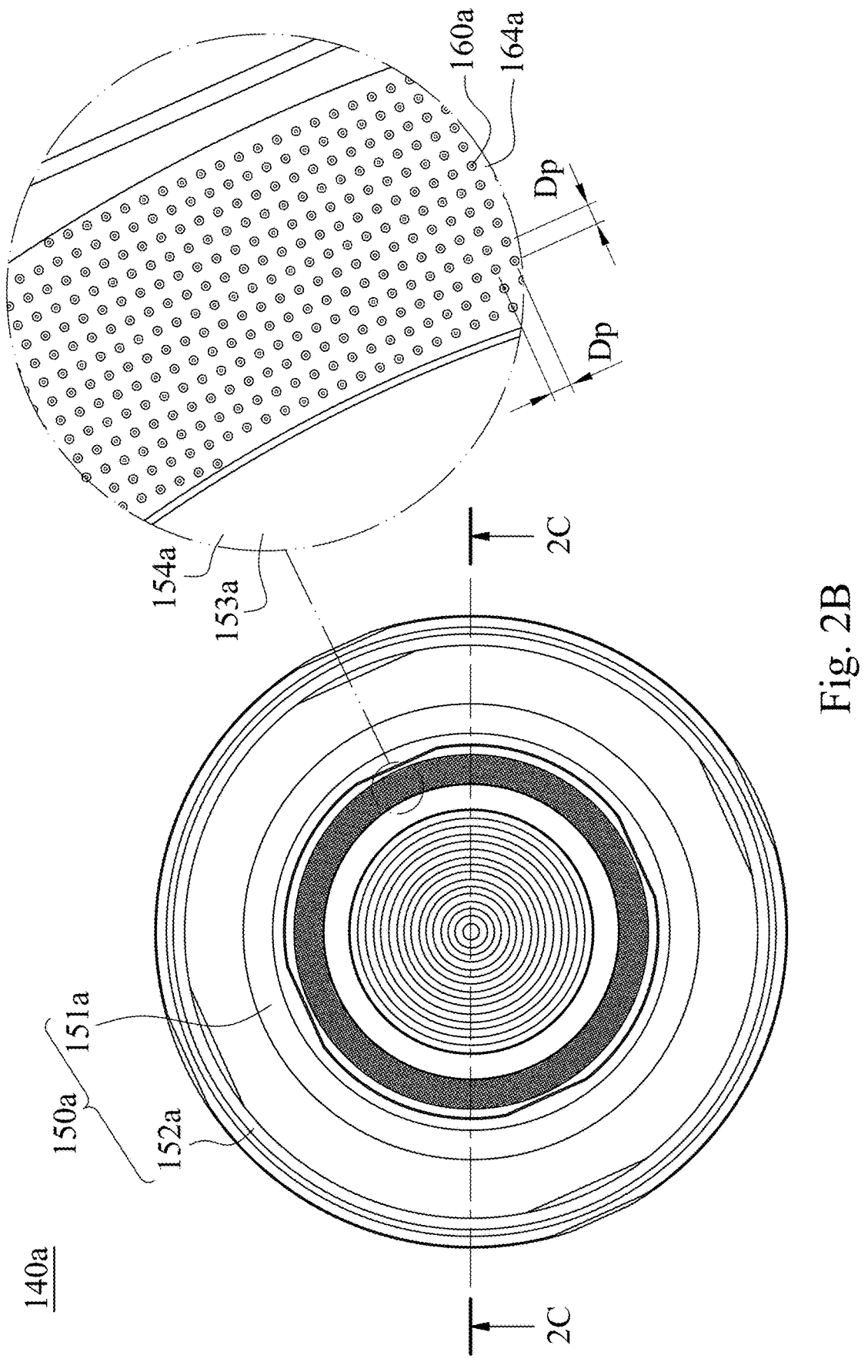
FIG. 2B is a top view of the optical lens assembly of the 1st example of the 1st embodiment in FIG. 2A.
Figure 2C:
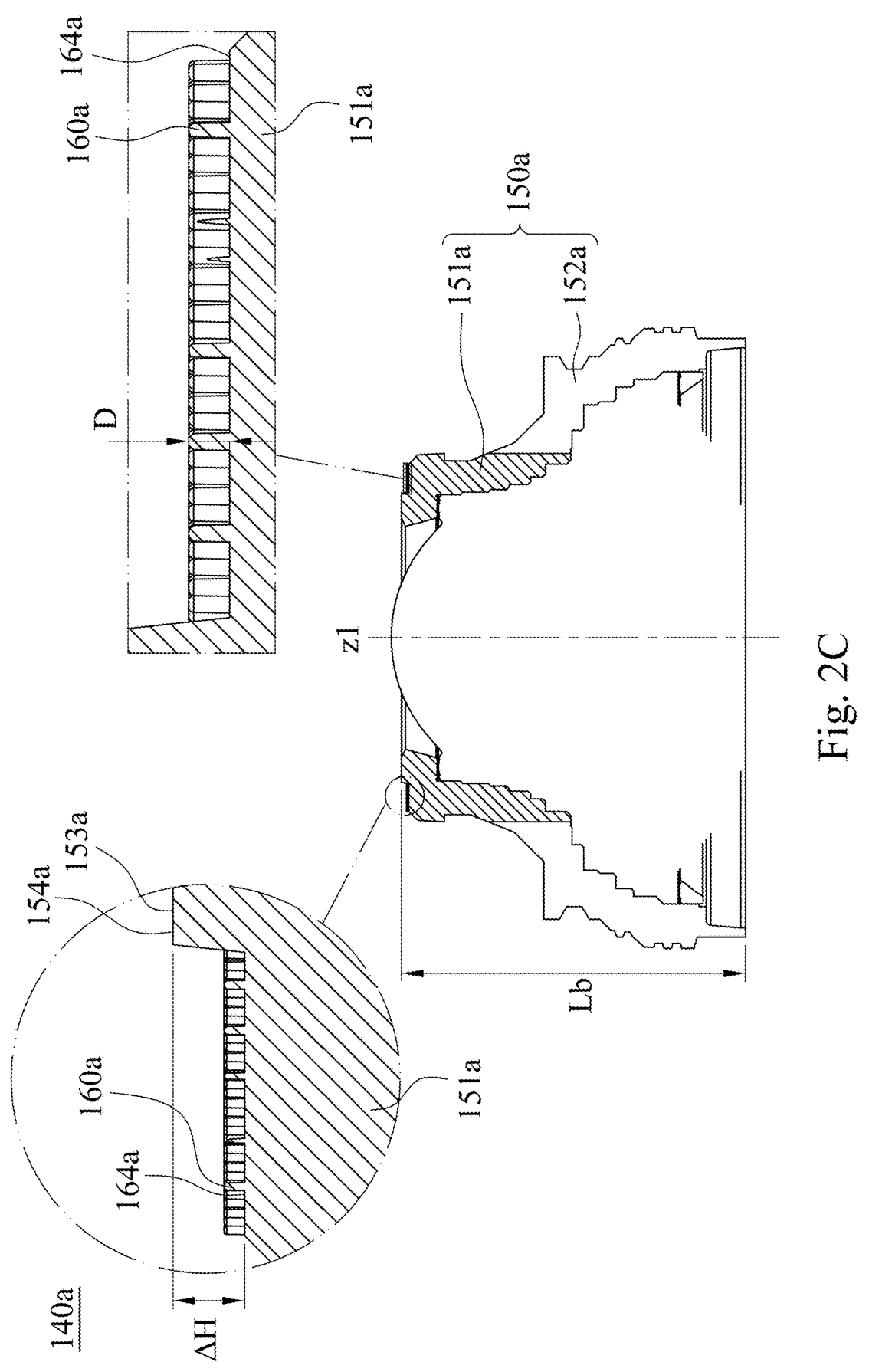
FIG. 2C is a cross-sectional view along line 2C-2C in FIG. 2B.

FIG. 2A is a three-dimensional view of an optical lens assembly 140a according to the 1st example of the 1st embodiment of the present disclosure, FIG. 2B is a top view of the optical lens assembly 140*a* of the 1st example of the 1st embodiment in FIG. 2A, and FIG. 2C is a cross-sectional view along line 20-20 in FIG. 2B. With reference to FIG. 1D, FIG. 2A to FIG. 2C, the imaging lens module 100 includes an optical lens assembly 140*a*, a plurality of monomer structures 160*a* and the cover member 110. The optical lens assembly 140*a* is disposed on the object side of the image surface 180 and defines an optical axis z1. The optical lens assembly 140*a* includes a light-blocking element 150*a*, which specifically a lens barrel and includes a light-blocking portion 151*a*. The light-blocking portion 151*a* is disposed closer to the optical axis z1 than a portion 152*a* of the light-blocking element 150*a* other than the light-blocking portion 151*a* to the optical axis z1. The monomer structures 160*a* are disposed on the object side of the image surface 180, and each of the monomer structures 160*a* is extended along a direction parallel to the optical axis z1. Each of the monomer structures 160*a* appears as a convex columnar structure protruding with a height from a disposing surface 164*a* of the light-blocking portion 151*a*. The cover member 110 is disposed on an object side of the optical lens assembly 140*a*, and the optical axis z1 passes through the cover member 110. The monomer structures 160*a* are disposed on the light-blocking portion 151*a* of the light-blocking element 150*a*.

In detail, with reference to FIG. 1D and FIG. 2C, the light-blocking portion 151*a* faces the object side of the optical lens assembly 140*a*. The light-blocking element 150*a* is extended along the direction parallel to the optical axis z1. The light-blocking element 150*a* further includes an object-side surface 154*a*, which is located at a most object-side portion 153*a* of the light-blocking element 150*a*. The object-side surface 154*a* faces the object side of the optical lens assembly 140*a*. Furthermore, the monomer structures 160*a* face the object side of the optical lens assembly 140*a*. The cover member 110 corresponds to and faces the light-blocking portion 151*a* of the light-blocking element 150*a*.

In FIG. 2B and FIG. 2C, a spacing distance between adjacent two of the monomer structures 160*a* is Dp, a length along the direction parallel to the optical axis z1 of each of the monomer structures 160*a* is D, a number of the monomer structures 160*a* on the light-blocking portion 151*a* is Nm, a length along the direction parallel to the optical axis z1 of the light-blocking element 150*a* is Lb, a height difference along the direction parallel to the optical axis z1 between the object-side surface 154*a* and the disposing surface 164*a* of the monomer structures 160*a* is ΔH, and the values of the above parameters are listed in the following Table 1.

TABLE 1

| 1st Example of 1st Embodiment | | | |
|---|---|---|---|
| Dp (mm) | 0.04 | Lb (mm) | 6.73 |
| D (mm) | 0.04 | ΔH (mm) | 0.14 |
| Nm | 6577 | ΔH/Lb | 0.02 |

In addition, for other details of the 1st example of the 1st embodiment, the related contents of the aforementioned 1st embodiment with FIG. 1A to FIG. 1E may be referred.

2nd Example of 1st Embodiment

Figure 3A:
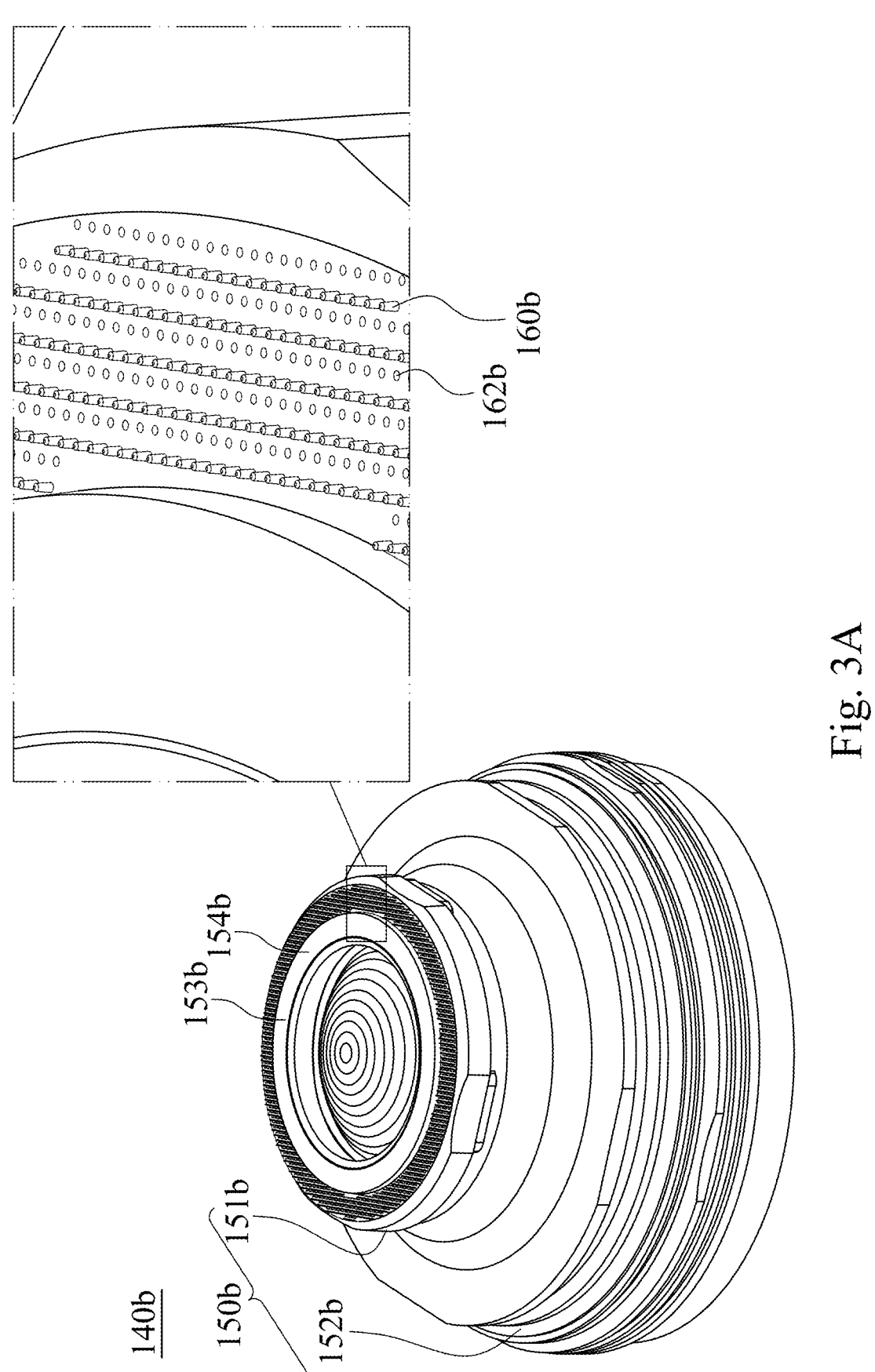
FIG. 3A is a three-dimensional view of an optical lens assembly according to the 2nd example of the 1st embodiment of the present disclosure.
Figure 3B:
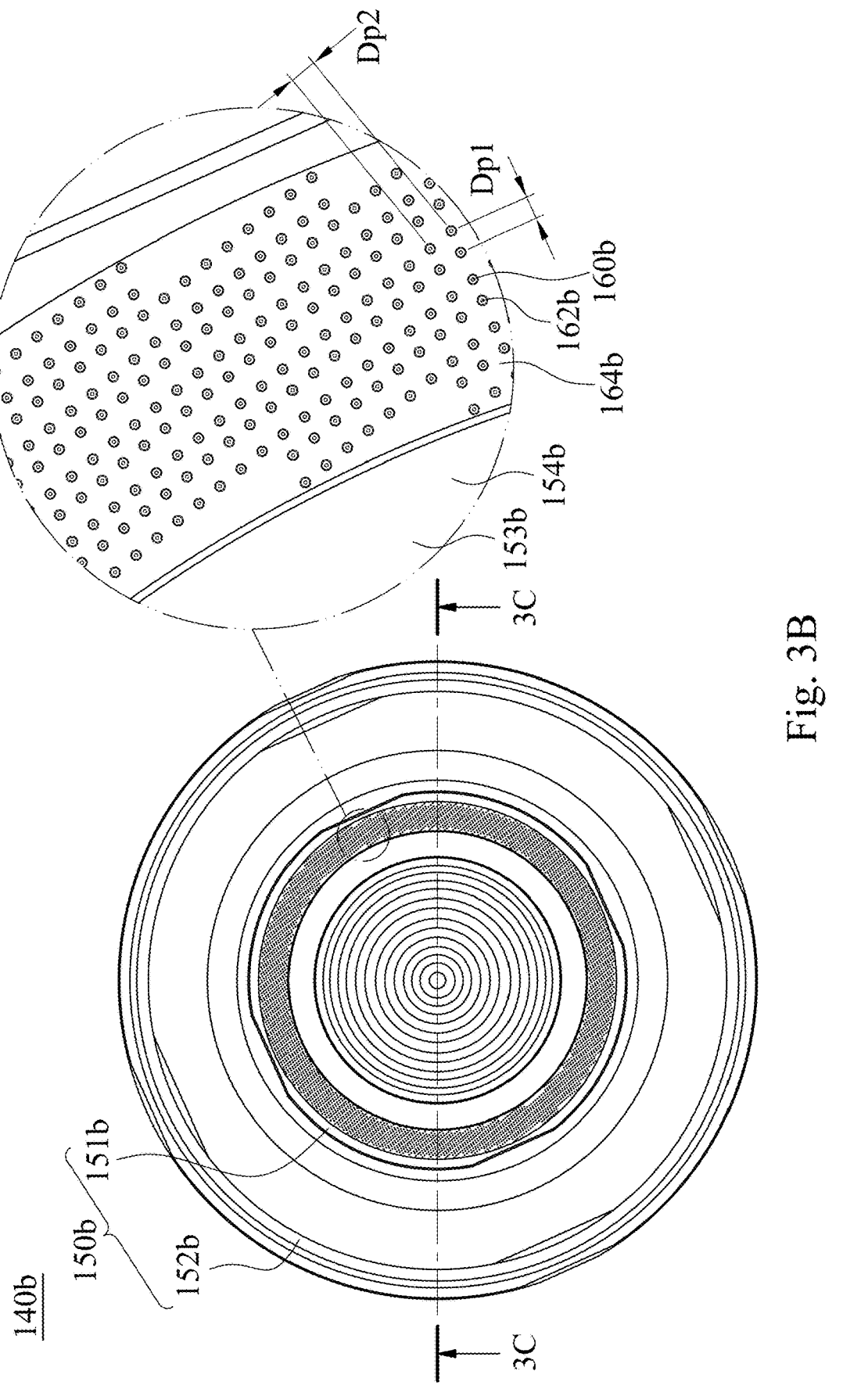
FIG. 3B is a top view of the optical lens assembly of the 2nd example of the 1st embodiment in FIG. 3A.
Figure 3C:
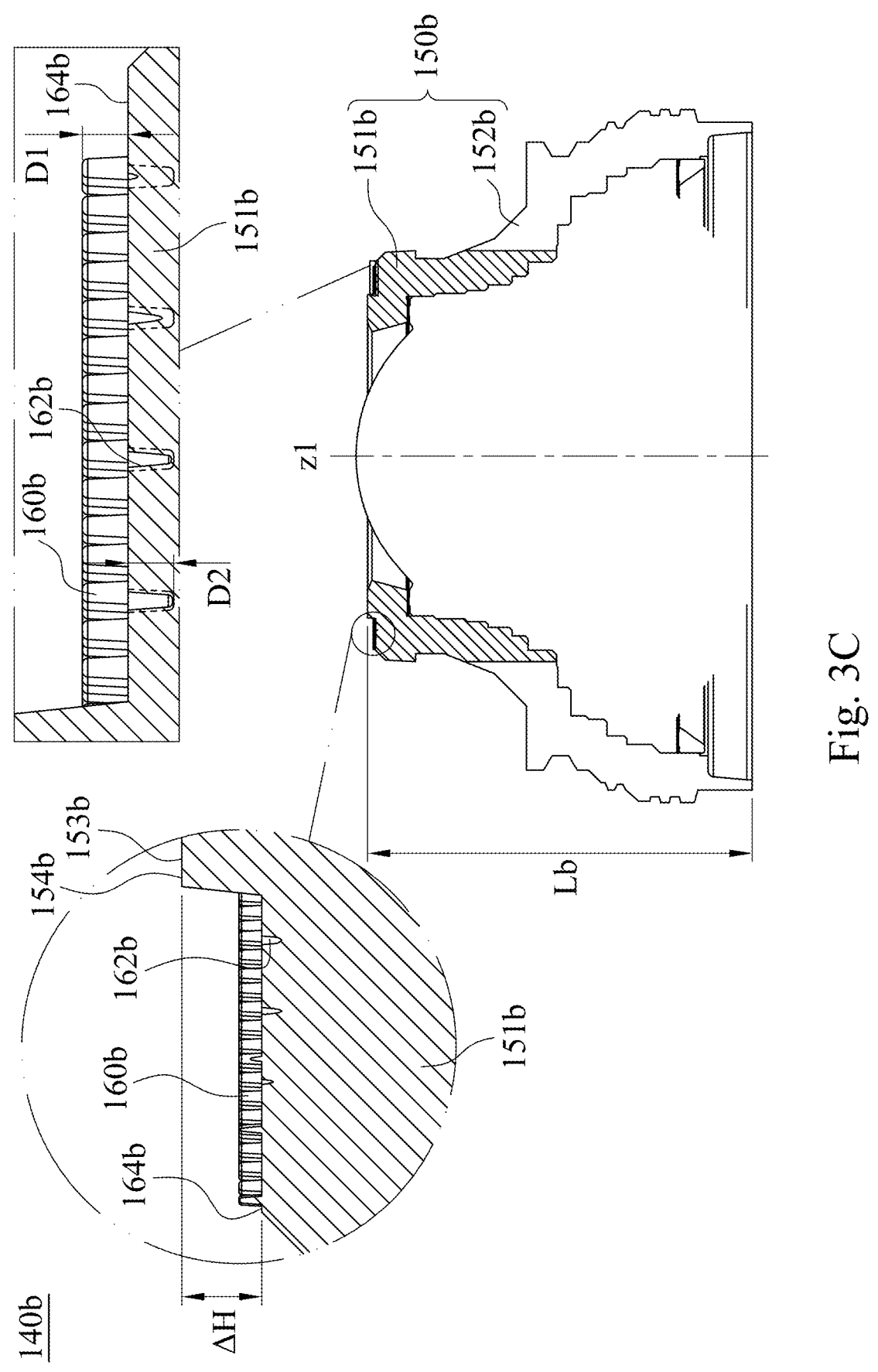
FIG. 3C is a cross-sectional view along line 3C-3C in FIG. 3B.

FIG. 3A is a three-dimensional view of an optical lens assembly 140*b* according to the 2nd example of the 1st embodiment of the present disclosure, FIG. 3B is a top view of the optical lens assembly 140*b* of the 2nd example of the 1st embodiment in FIG. 3A, and FIG. 3C is a cross-sectional view along line 3C-3C in FIG. 3B. With reference to FIG. 1D, FIG. 3A to FIG. 3C, the imaging lens module 100 includes an optical lens assembly 140*b*, a plurality of monomer structures 160*b*, 162*b* and the cover member 110. The optical lens assembly 140*b* is disposed on the object side of the image surface 180 and defines an optical axis z1. The optical lens assembly 140*b* includes a light-blocking element 150*b*, which specifically a lens barrel and includes a light-blocking portion 151*b*. The light-blocking portion 151*b* is disposed closer to the optical axis z1 than a portion 152*b* of the light-blocking element 150*b* other than the light-blocking portion 151*b* to the optical axis z1. The monomer structures 160*b*, 162*b* are disposed on the object side of the image surface 180, and each monomer structure of the monomer structures 160*b*, 162*b* is extended along a direction parallel to the optical axis z1. Each of the monomer structures 160*b* appears as a convex columnar structure protruding with a height from a disposing surface 164*b* of the light-blocking portion 151*b*, and each of the monomer structures 162*b* appears as a concave columnar structure recessed with a depth from the disposing surface 164*b* of the light-blocking portion 151*b* toward another surface. The first monomer rows formed by the arrangement of the monomer structures 160*b* and the second monomer rows formed by the arrangement of the monomer structures 162*b* are alternately arranged, as shown in FIG. 3A. The cover member 110 is disposed on an object side of the optical lens assembly 140*b*, and the optical axis z1 passes through the cover member 110. The monomer structures 160*b*, 162*b* are disposed on the light-blocking portion 151*b* of the light-blocking element 150*b*.

In detail, with reference to FIG. 1D and FIG. 3C, the light-blocking portion 151*b* faces the object side of the optical lens assembly 140*b*. The light-blocking element 150*b* is extended along the direction parallel to the optical axis z1. The light-blocking element 150*b* further includes an object-side surface 154*b*, which is located at a most object-side portion 153*b* of the light-blocking element 150*b*. The object-side surface 154*b* faces the object side of the optical lens assembly 140*b*. Furthermore, the monomer structures 160*b*, 162*b* face the object side of the optical lens assembly 140*b*. The cover member 110 corresponds to and faces the light-blocking portion 151*b* of the light-blocking element 150*b*.

In FIG. 3B and FIG. 3C, a spacing distance between one of the monomer structures 160*b* and one of the monomer structures 162*b* being adjacent to each other is Dp1, a spacing distance between adjacent two of the monomer structures 160*b* is Dp2, a spacing distance between adjacent two of the monomer structures 162*b* is Dp2, a length along the direction parallel to the optical axis z1 of each of the monomer structures 160*b* is D1, a length/depth along the direction parallel to the optical axis z1 of each of the monomer structures 162*b* is D2, a sum of numbers of the monomer structures 160*b*, 162*b* on the light-blocking portion 151*b* is Nm, a length along the direction parallel to the optical axis z1 of the light-blocking element 150*b* is Lb, a height difference along the direction parallel to the optical axis z1 between the object-side surface 154*b* and the disposing surface 164*b* of the monomer structures 160*b*, 162*b* is ΔH, and the values of the above parameters are listed in the following Table 2.

TABLE 2

| 2nd Example of 1st Embodiment | | | |
|---|---|---|---|
| Dp1 (mm) | 0.044 | Nm | 3906 |
| Dp2 (mm) | 0.052 | Lb (mm) | 6.73 |
| D1 (mm) | 0.04 | ΔH (mm) | 0.14 |
| D2 (mm) | 0.04 | ΔH/Lb | 0.02 |

In addition, for other details of the 2nd example of the 1st embodiment, the related contents of the aforementioned 1st embodiment with FIG. 1A to FIG. 1E may be referred.

3rd Example of 1st Embodiment

Figure 4A:
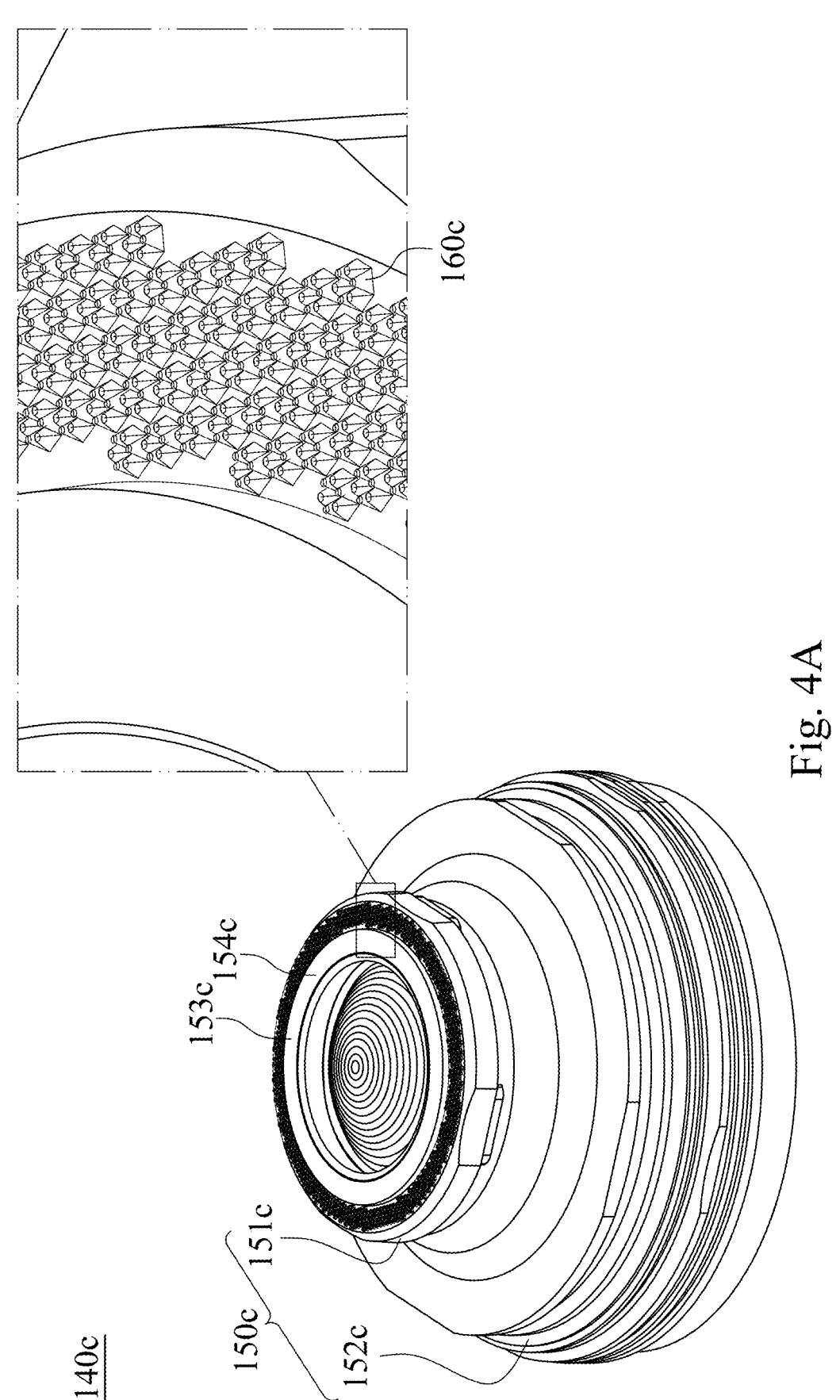
FIG. 4A is a three-dimensional view of an optical lens assembly according to the 3rd example of the 1st embodiment of the present disclosure.
Figure 4B:
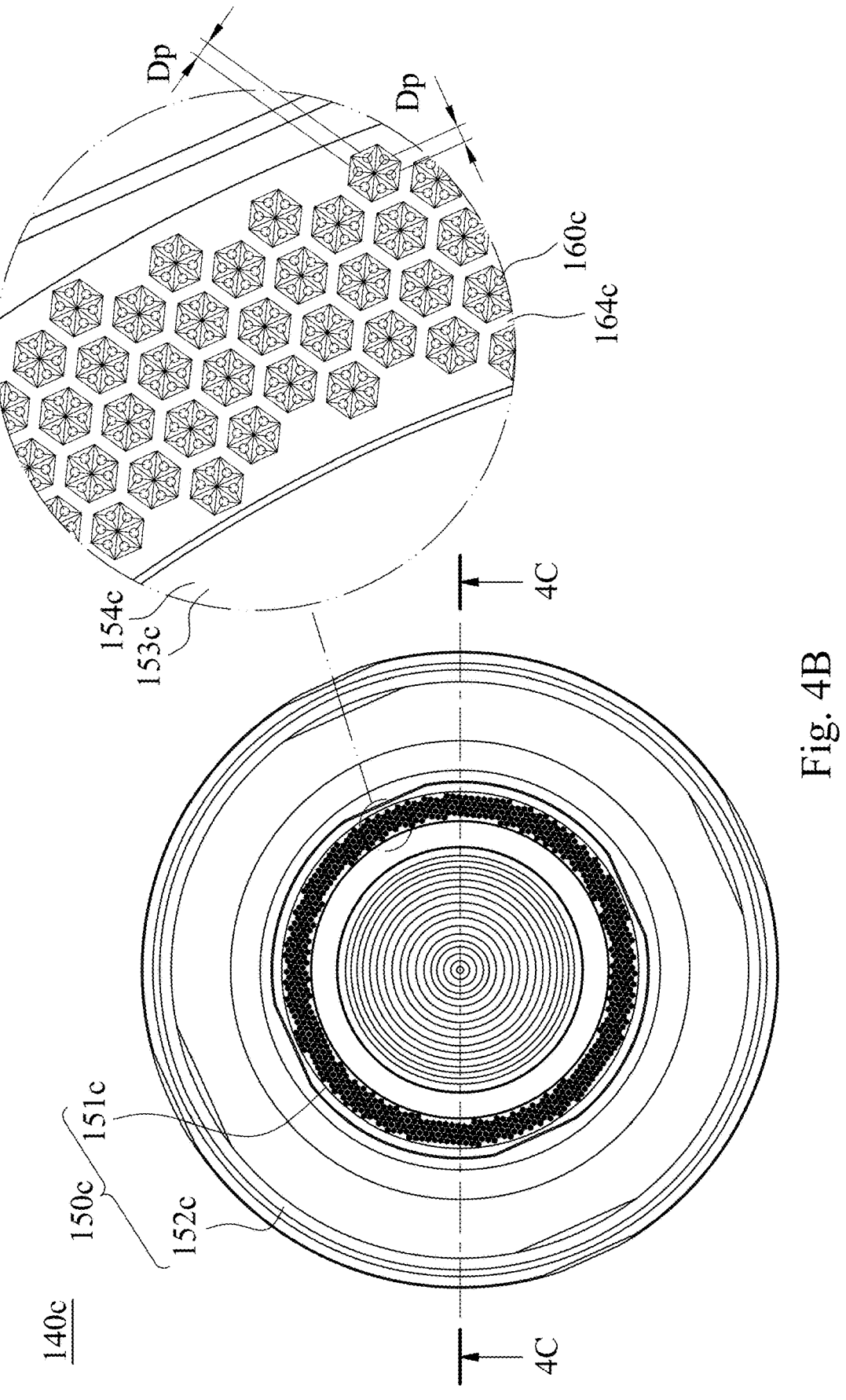
FIG. 4B is a top view of the optical lens assembly of the 3rd example of the 1st embodiment in FIG. 4A.
Figure 4C:
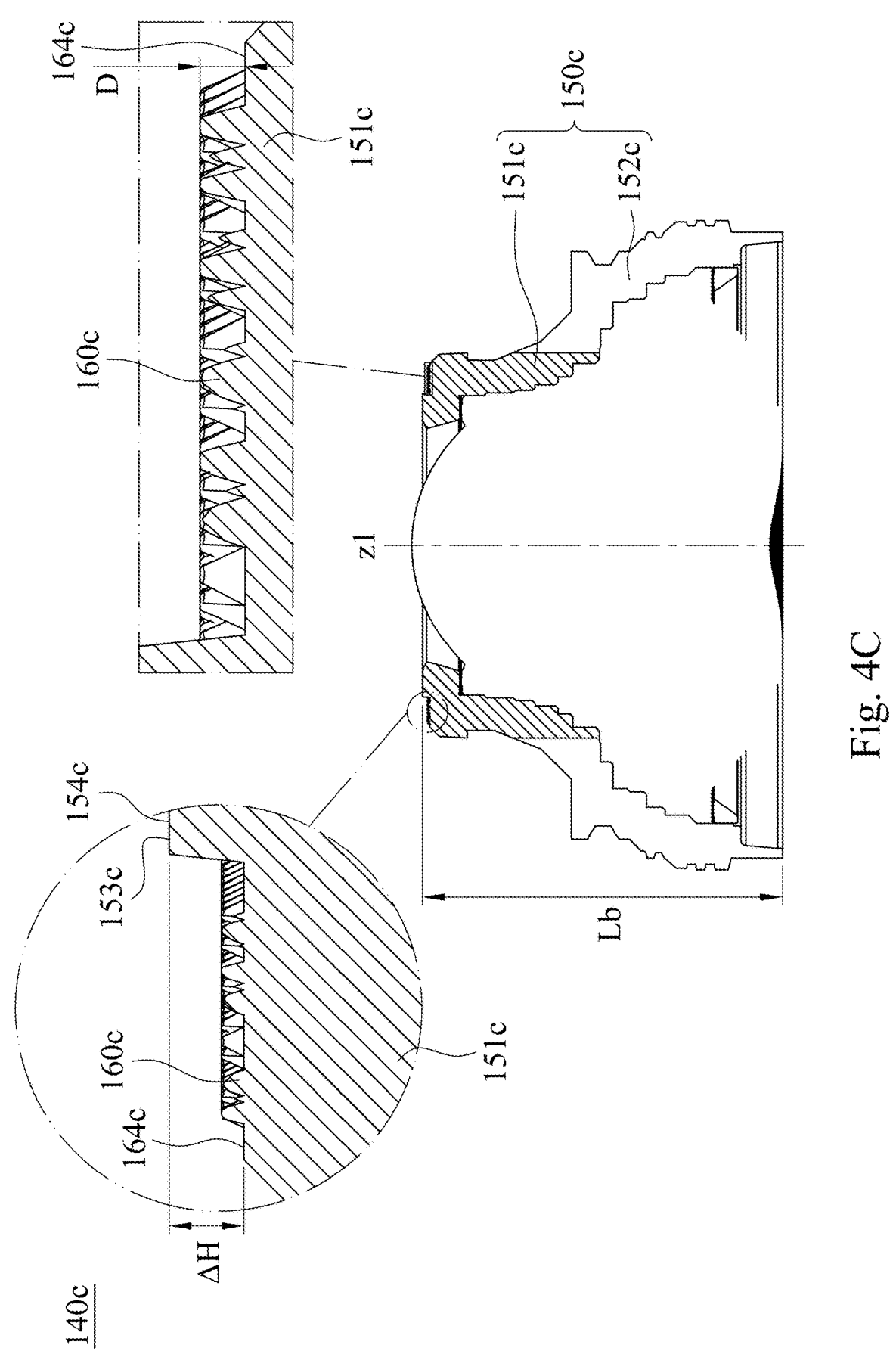
FIG. 4C is a cross-sectional view along line 4C-4C in FIG. 4B.

FIG. 4A is a three-dimensional view of an optical lens assembly 140c according to the 3rd example of the 1st embodiment of the present disclosure, FIG. 4B is a top view of the optical lens assembly 140c of the 3rd example of the 1st embodiment in FIG. 4A, and FIG. 4C is a cross-sectional view along line 4C-4C in FIG. 4B. With reference to FIG. 1D, FIG. 3A to FIG. 3C, the imaging lens module 100 includes an optical lens assembly 140c, a plurality of monomer structures 160c and the cover member 110. The optical lens assembly 140c is disposed on the object side of the image surface 180 and defines an optical axis z1. The optical lens assembly 140c includes a light-blocking element 150c, which specifically a lens barrel and includes a light-blocking portion 151c. The light-blocking portion 151c is disposed closer to the optical axis z1 than a portion 152c of the light-blocking element 150c other than the light-blocking portion 151c to the optical axis z1. The monomer structures 160c are disposed on the object side of the image surface 180, and each of the monomer structures 160c is extended along a direction parallel to the optical axis z1. Each of the monomer structures 160c appears as a convex columnar structure protruding with a height from a disposing surface 164c of the light-blocking portion 151c, and each group is formed by the arrangement of six of the monomer structures 160c, as shown in FIG. 4A and FIG. 4B. The cover member 110 is disposed on an object side of the optical lens assembly 140c, and the optical axis z1 passes through the cover member 110. The monomer structures 160c are disposed on the light-blocking portion 151c of the light-blocking element 150c.

In detail, with reference to FIG. 1D and FIG. 4C, the light-blocking portion 151c faces the object side of the optical lens assembly 140c. The light-blocking element 150c is extended along the direction parallel to the optical axis z1. The light-blocking element 150c further includes an object-side surface 154c, which is located at a most object-side portion 153c of the light-blocking element 150c. The object-side surface 154c faces the object side of the optical lens assembly 140c. Furthermore, the monomer structures 160c face the object side of the optical lens assembly 140c. The cover member 110 corresponds to and faces the light-blocking portion 151c of the light-blocking element 150c.

In FIG. 4B and FIG. 4C, a spacing distance between adjacent two of the monomer structures 160c is Dp, a length along the direction parallel to the optical axis z1 of each of the monomer structures 160c is D, a number of the monomer structures 160c on the light-blocking portion 151c is Nm, a length along the direction parallel to the optical axis z1 of the light-blocking element 150c is Lb, a height difference along the direction parallel to the optical axis z1 between the object-side surface 154c and the disposing surface 164c of the monomer structures 160c is ΔH, and the values of the above parameters are listed in the following Table 3.

TABLE 3

| 3rd Example of 1st Embodiment | | | |
|---|---|---|---|
| Dp (mm) | 0.032 | Lb (mm) | 6.73 |
| D (mm) | 0.04 | ΔH (mm) | 0.14 |
| Nm | 2824 | ΔH/Lb | 0.02 |

In addition, for other details of the 3rd example of the 1st embodiment, the related contents of the aforementioned 1st embodiment with FIG. 1A to FIG. 1E may be referred.

4th Example of 1st Embodiment

Figure 5A:
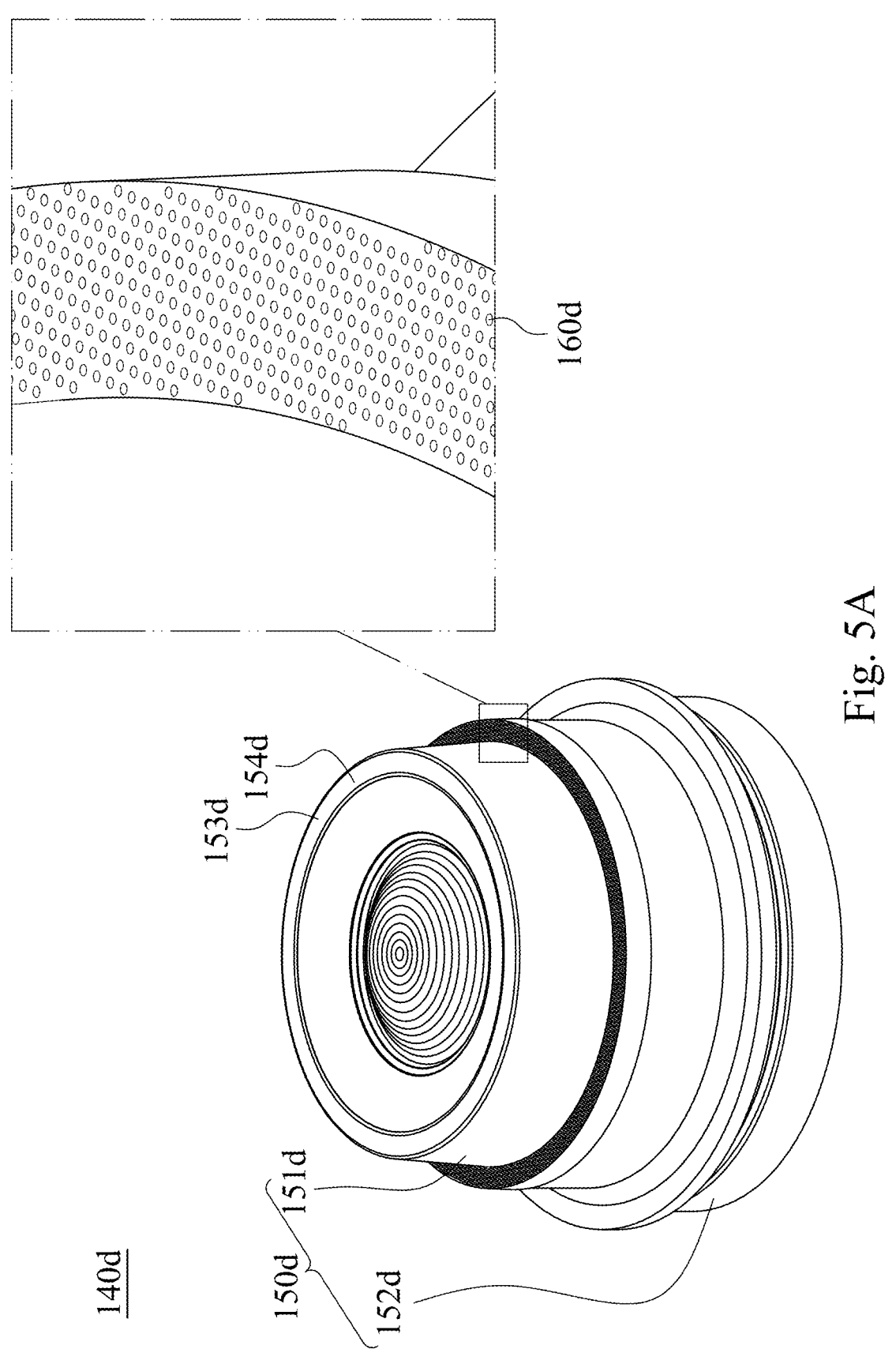
FIG. 5A is a three-dimensional view of an optical lens assembly according to the 4th example of the 1st embodiment of the present disclosure.
Figure 5B:
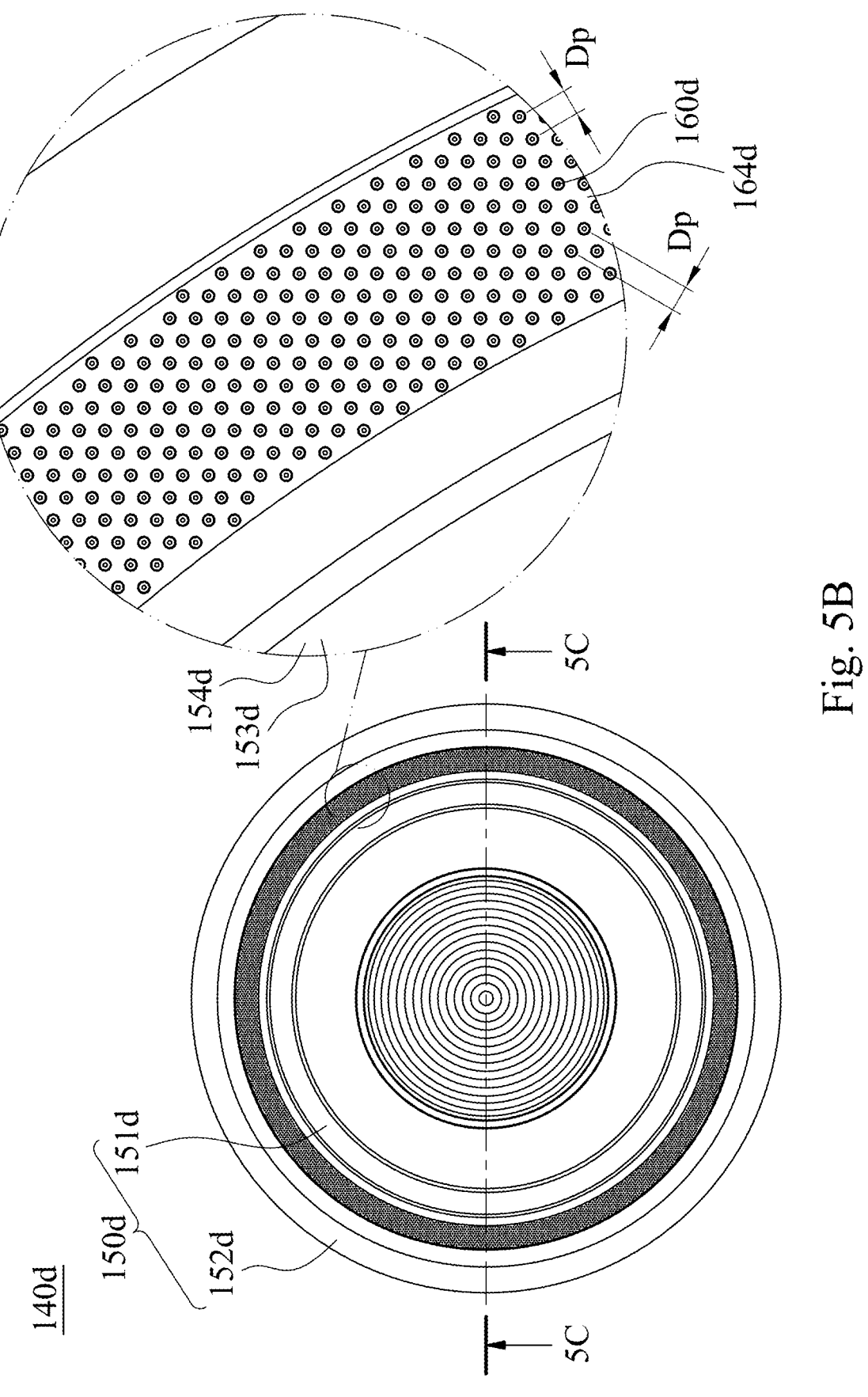
FIG. 5B is a top view of the optical lens assembly of the 4th example of the 1st embodiment in FIG. 5A.
Figure 5C:
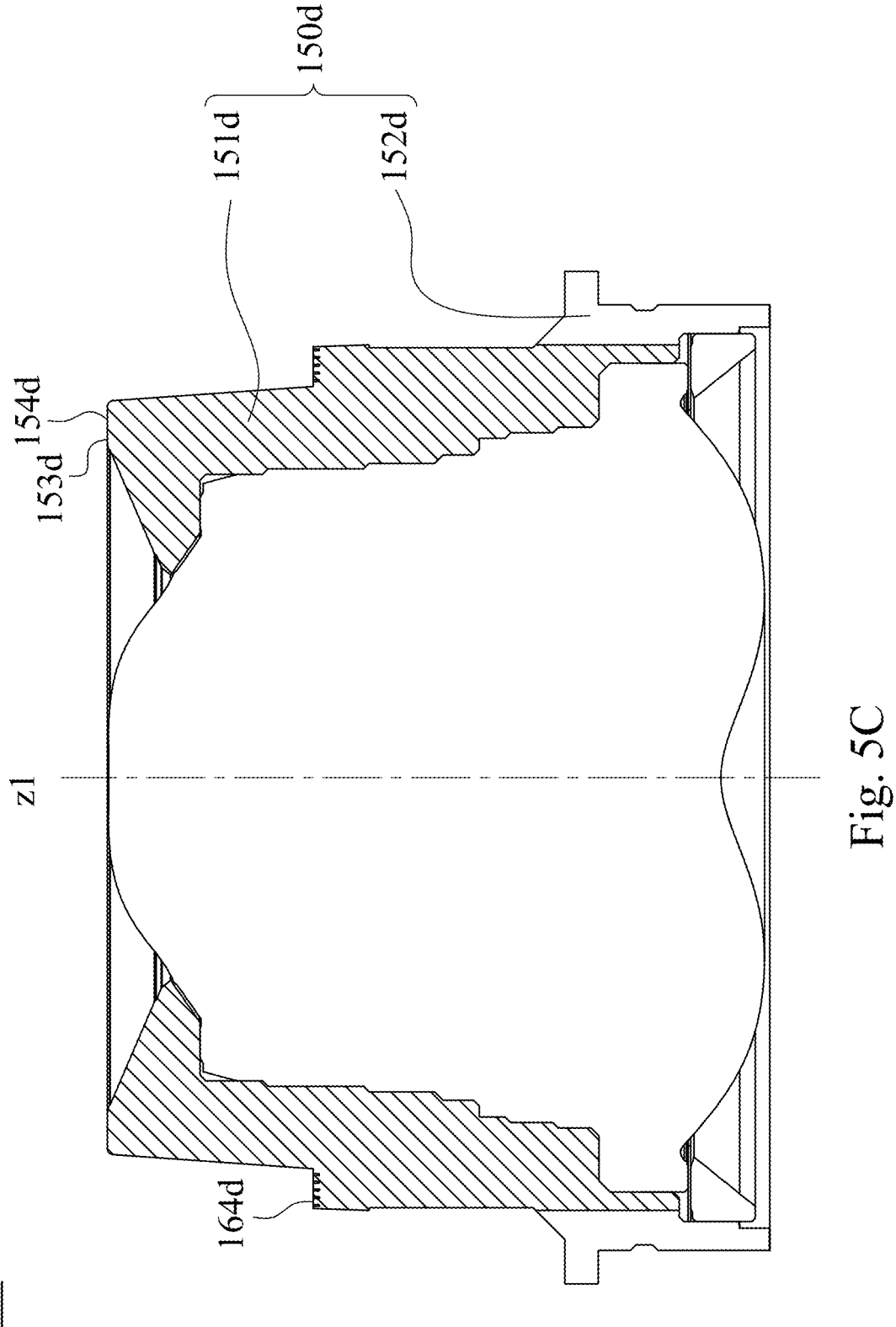
FIG. 5C is a cross-sectional view along line 50-5C in FIG. 5B.
Figure 5D:
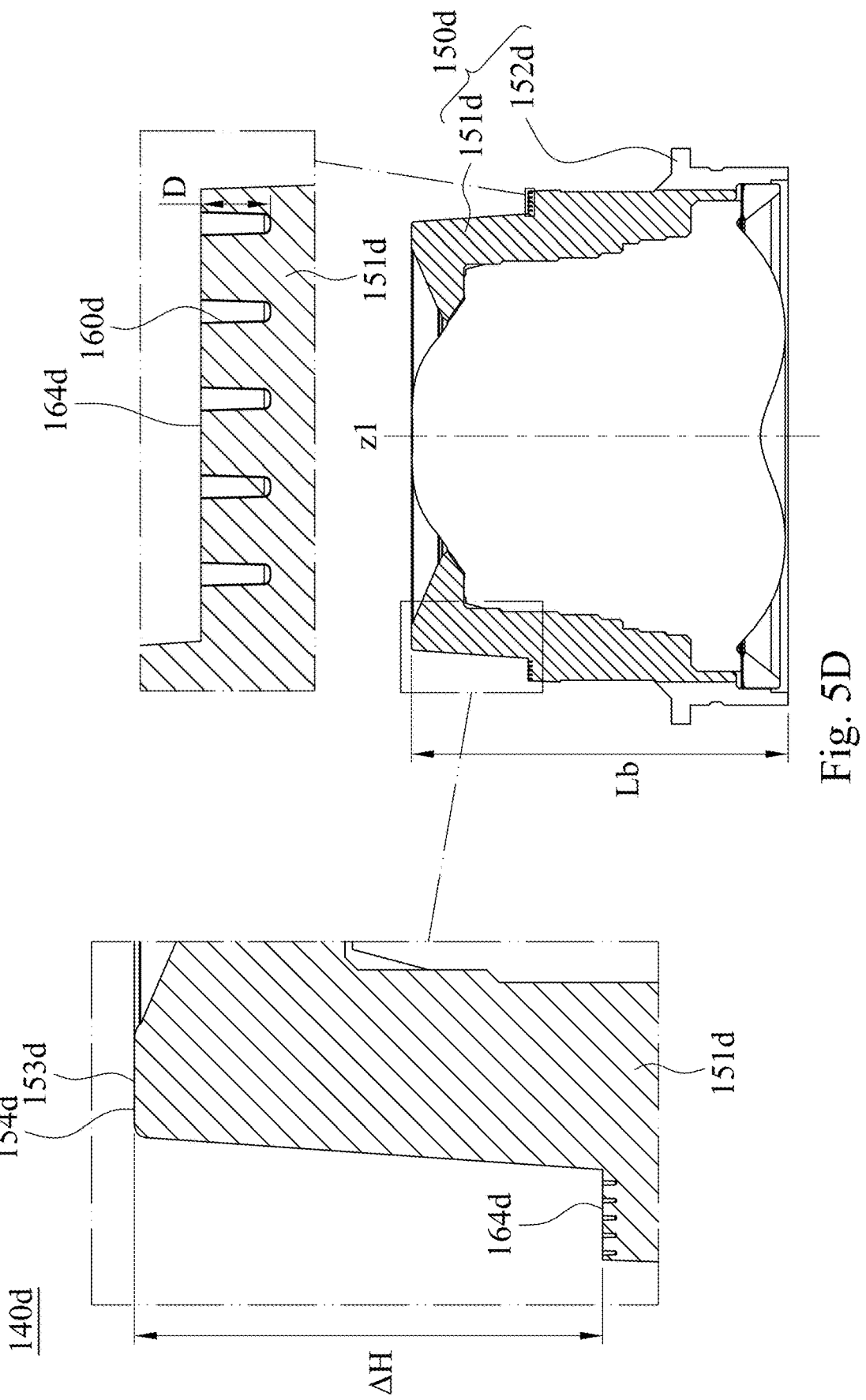
FIG. 5D is an enlarged view of the optical lens assembly in FIG. 5C.

FIG. 5A is a three-dimensional view of an optical lens assembly 140d according to the 4th example of the 1st embodiment of the present disclosure, FIG. 5B is a top view of the optical lens assembly 140d of the 4th example of the 1st embodiment in FIG. 5A, FIG. 5C is a cross-sectional view along line 50-5C in FIG. 5B, and FIG. 5D is an enlarged view of the optical lens assembly 140d in FIG. 5C. With reference to FIG. 1D, FIG. 5A to FIG. 5D, the imaging lens module 100 includes an optical lens assembly 140d, a plurality of monomer structures 160d and the cover member 110. The optical lens assembly 140d is disposed on the object side of the image surface 180 and defines an optical axis z1. The optical lens assembly 140d includes a light-blocking element 150d, which specifically a lens barrel and includes a light-blocking portion 151d. The light-blocking portion 151d is disposed closer to the optical axis z1 than a portion 152d of the light-blocking element 150d other than the light-blocking portion 151d to the optical axis z1. The monomer structures 160d are disposed on the object side of the image surface 180, and each of the monomer structures 160d is extended along a direction parallel to the optical axis z1. Each of the monomer structures 160d appears as a concave columnar structure recessed with a depth from the disposing surface 164d of the light-blocking portion 151d toward another surface. The cover member 110 is disposed on an object side of the optical lens assembly 140d, and the optical axis z1 passes through the cover member 110. The monomer structures 160d are disposed on the light-blocking portion 151d of the light-blocking element 150d.

In detail, with reference to FIG. 1D and FIG. 5D, the light-blocking portion 151d faces the object side of the optical lens assembly 140d. The light-blocking element 150d is extended along the direction parallel to the optical axis z1. The light-blocking element 150d further includes an object-side surface 154d, which is located at a most object-side portion 153d of the light-blocking element 150d. The object-side surface 154d faces the object side of the optical lens assembly 140d. Furthermore, the monomer structures 160d face the object side of the optical lens assembly 140d. The cover member 110 corresponds to and faces the light-blocking portion 151d of the light-blocking element 150d.

In FIG. 5B and FIG. 5D, a spacing distance between adjacent two of the monomer structures 160d is Dp, a length/depth along the direction parallel to the optical axis z1 of each of the monomer structures 160d is D, a number of the monomer structures 160d on the light-blocking portion 151d is Nm, a length along the direction parallel to the optical axis z1 of the light-blocking element 150d is Lb, a height difference along the direction parallel to the optical axis z1 between the object-side surface 154d and the disposing surface 164d of the monomer structures 160d is ΔH, and the values of the above parameters are listed in the following Table 4.

TABLE 4

| 4th Example of 1st Embodiment | | | |
|---|---|---|---|
| Dp (mm) | 0.04 | Lb (mm) | 5.95 |
| D (mm) | 0.055 | ΔH (mm) | 1.85 |
| Nm | 5665 | ΔH/Lb | 0.31 |

In addition, for other details of the 4th example of the 1st embodiment, the related contents of the aforementioned 1st embodiment with FIG. 1A to FIG. 1E may be referred.

5th Example of 1st Embodiment

Figure 6A:
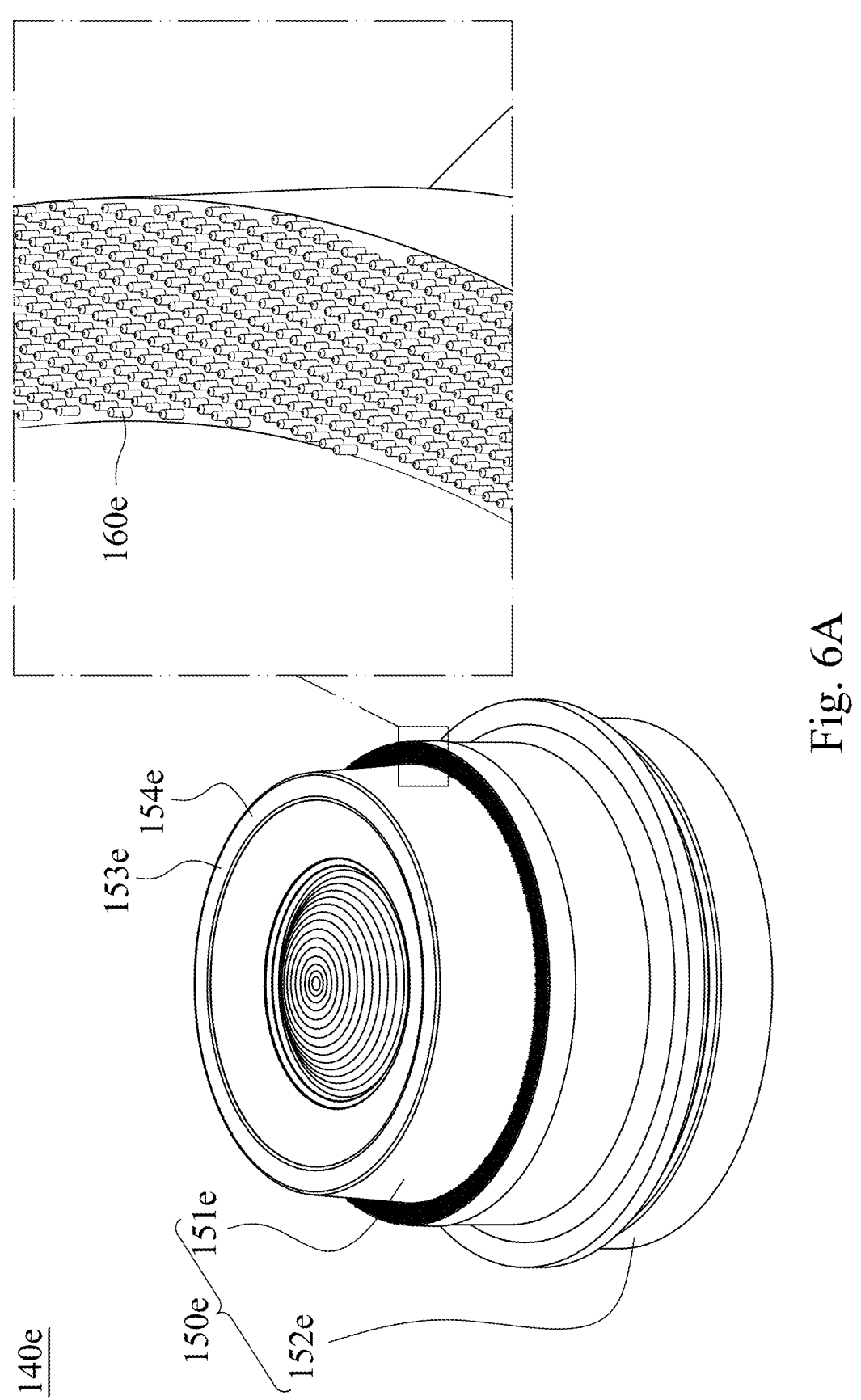
FIG. 6A is a three-dimensional view of an optical lens assembly according to the 5th example of the 1st embodiment of the present disclosure.
Figure 6B:
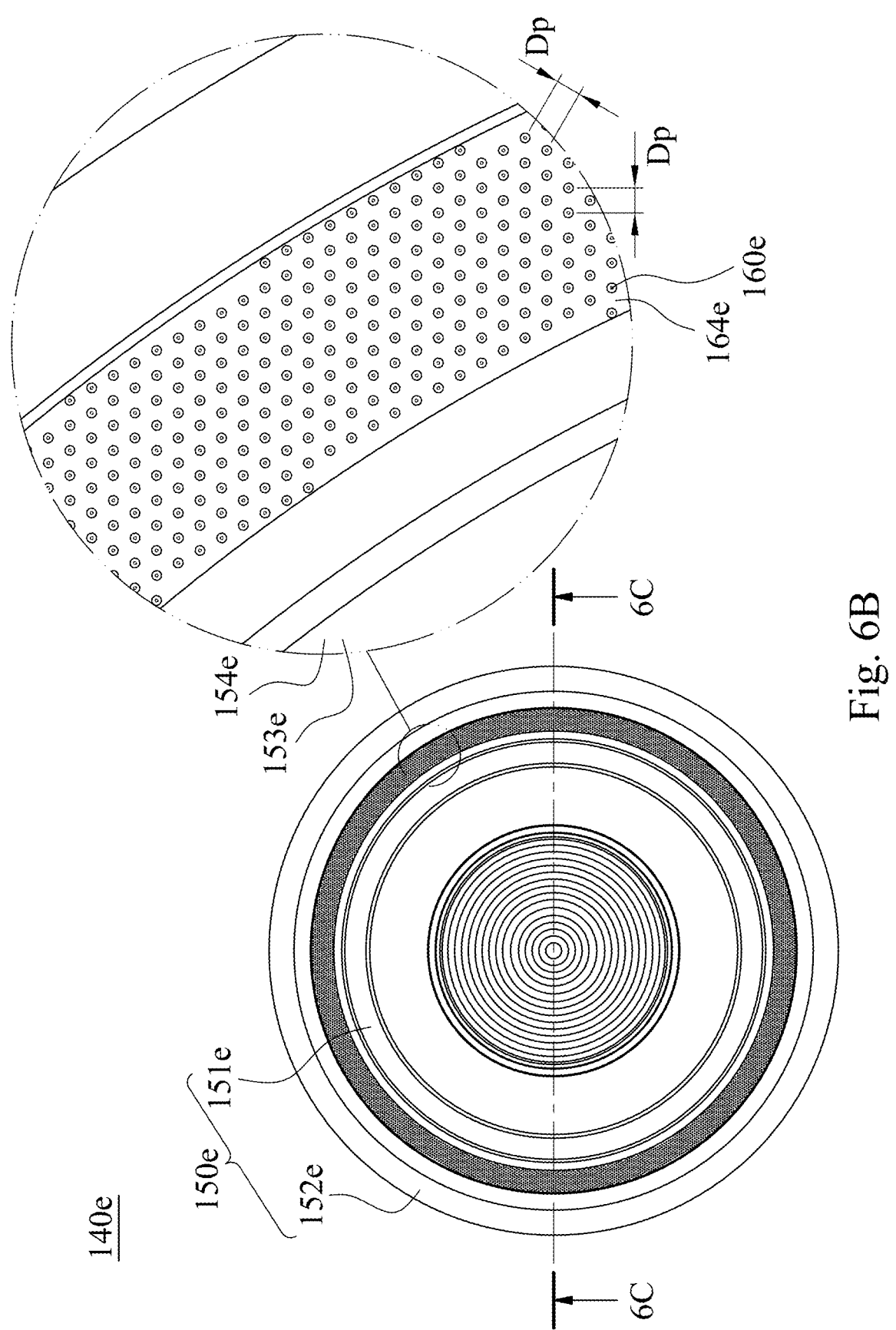
FIG. 6B is a top view of the optical lens assembly of the 5h example of the 1st embodiment in FIG. 6A.
Figure 6C:
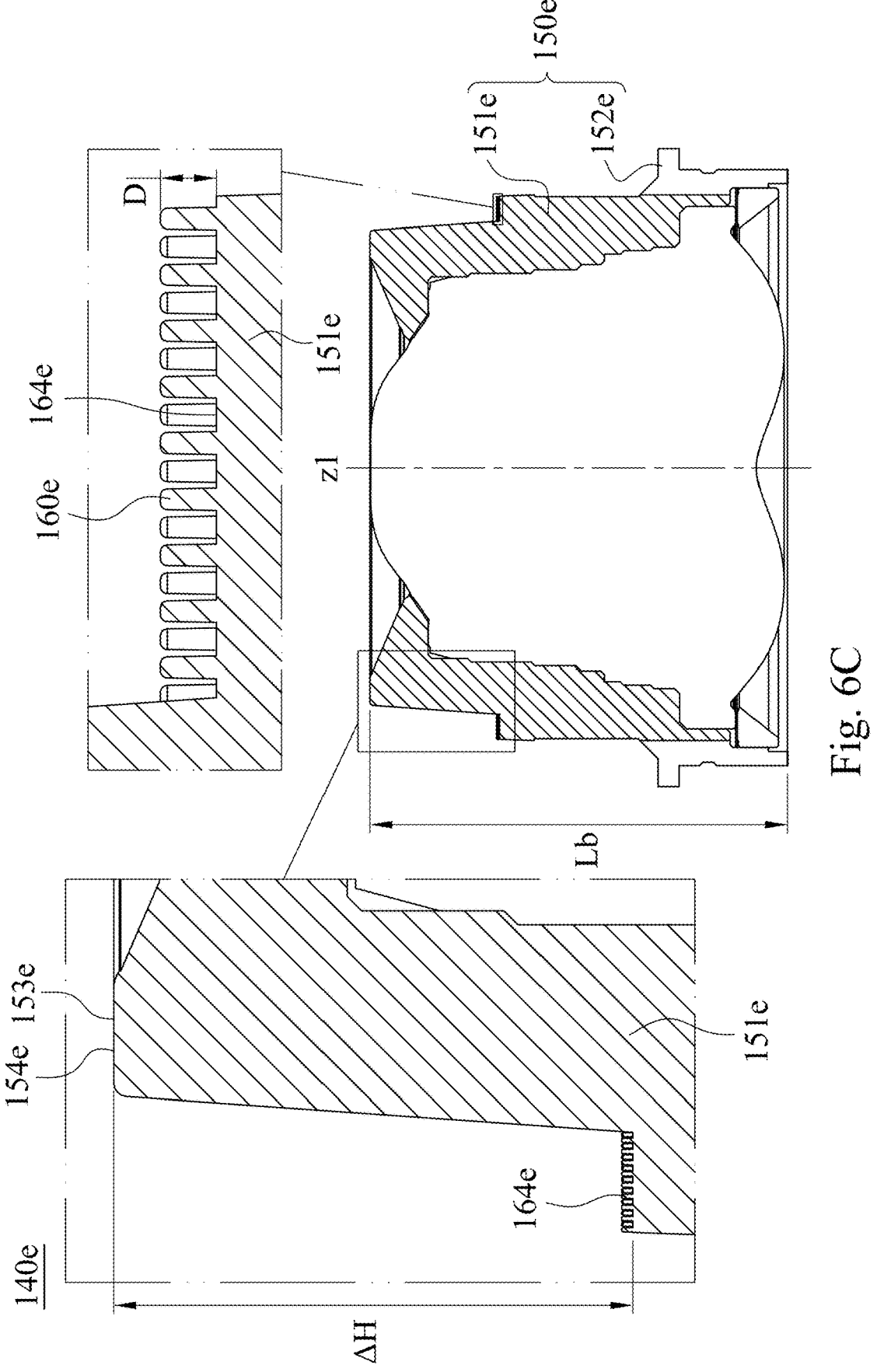
FIG. 6C is a cross-sectional view along line 6C-6C in FIG. 6B.

FIG. 6A is a three-dimensional view of an optical lens assembly 140e according to the 5th example of the 1st embodiment of the present disclosure, FIG. 6B is a top view of the optical lens assembly 140e of the 5h example of the 1st embodiment in FIG. 6A, and FIG. 6C is a cross-sectional view along line 6C-6C in FIG. 6B. With reference to FIG. 1D, FIG. 6A to FIG. 6C, the imaging lens module 100 includes an optical lens assembly 140e, a plurality of monomer structures 160e and the cover member 110. The optical lens assembly 140e is disposed on the object side of the image surface 180 and defines an optical axis z1. The optical lens assembly 140e includes a light-blocking element 150e, which specifically a lens barrel and includes a light-blocking portion 151e. The light-blocking portion 151a is disposed closer to the optical axis z1 than a portion 152e of the light-blocking element 150e other than the light-blocking portion 151e to the optical axis z1. The monomer structures 160e are disposed on the object side of the image surface 180, and each of the monomer structures 160e is extended along a direction parallel to the optical axis z1. Each of the monomer structures 160e appears as a convex columnar structure protruding with a height from a disposing surface 164a of the light-blocking portion 151e. The cover member 110 is disposed on an object side of the optical lens assembly 140e, and the optical axis z1 passes through the cover member 110. The monomer structures 160e are disposed on the light-blocking portion 151e of the light-blocking element 150e.

In detail, with reference to FIG. 1D and FIG. 6C, the light-blocking portion 151e faces the object side of the optical lens assembly 140e. The light-blocking element 150e is extended along the direction parallel to the optical axis z1. The light-blocking element 150e further includes an object-side surface 154e, which is located at a most object-side portion 153e of the light-blocking element 150e. The object-side surface 154e faces the object side of the optical lens assembly 140e. Furthermore, the monomer structures 160e face the object side of the optical lens assembly 140e. The cover member 110 corresponds to and faces the light-blocking portion 151e of the light-blocking element 150e.

In FIG. 6B and FIG. 6C, a spacing distance between adjacent two of the monomer structures 160e is Dp, a length along the direction parallel to the optical axis z1 of each of the monomer structures 160e is D, a number of the monomer structures 160e on the light-blocking portion 151e is Nm, a length along the direction parallel to the optical axis z1 of the light-blocking element 150e is Lb, a height difference along the direction parallel to the optical axis z1 between the object-side surface 154e and the disposing surface 164e of the monomer structures 160e is ΔH, and the values of the above parameters are listed in the following Table 5.

TABLE 5

| 5th Example of 1st Embodiment | | | |
|---|---|---|---|
| Dp (mm) | 0.04 | Lb (mm) | 5.95 |
| D (mm) | 0.04 | ΔH (mm) | 1.85 |
| Nm | 5704 | ΔH/Lb | 0.31 |

In addition, for other details of the 5th example of the 1st embodiment, the related contents of the aforementioned 1st embodiment with FIG. 1A to FIG. 1E may be referred.

6th Example of 1st Embodiment

Figure 7:
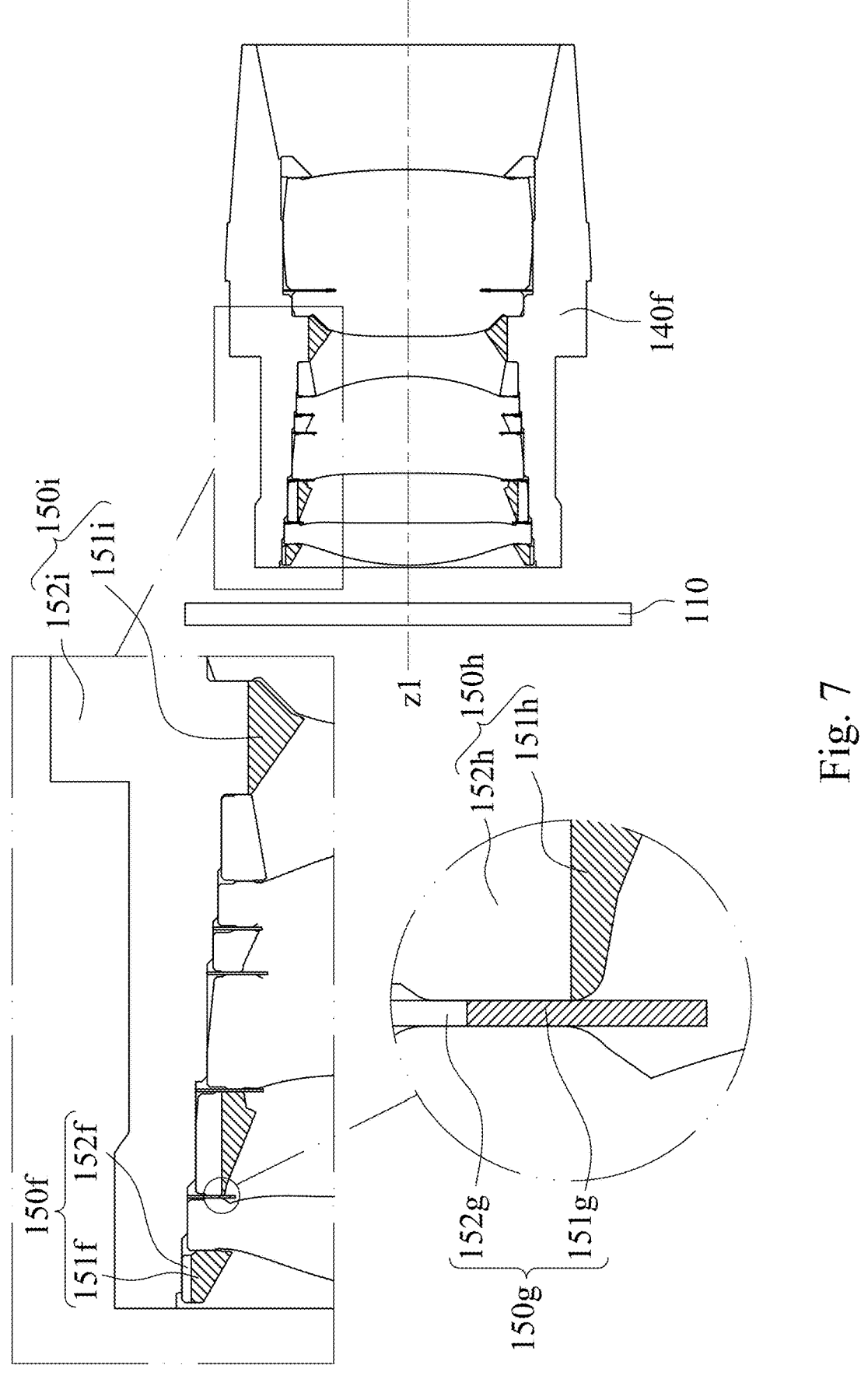
FIG. 7 is a three-dimensional view of an optical lens assembly according to the 6th example of the 1st embodiment of the present disclosure.

FIG. 7 is a three-dimensional view of an optical lens assembly 140f according to the 6th example of the 1st embodiment of the present disclosure. With reference to FIG. 1D and FIG. 7, the imaging lens module includes an optical lens assembly 140f and the cover member 110. The optical lens assembly 140f is disposed on the object side of the image surface 180 and defines an optical axis z1. The optical lens assembly 140f includes light-blocking elements 150f, 150g, 150h, 150i. The light-blocking element 150f is specifically a retainer and includes a light-blocking portion 151f, and the light-blocking portion 151f is disposed closer to the optical axis z1 than a portion 152f of the light-blocking element 150f other than the light-blocking portion 151f to the optical axis z1. The light-blocking element 150g is specifically a light-blocking sheet and includes a light-blocking portion 151g, and the light-blocking portion 151g is disposed closer to the optical axis z1 than a portion 152g of the light-blocking element 150g other than the light-blocking portion 151g to the optical axis z1. The light-blocking element 150h is specifically a spacer and includes a light-blocking portion 151h, and the light-blocking portion 151h is disposed closer to the optical axis z1 than a portion 152h of the light-blocking element 150h other than the light-blocking portion 151h to the optical axis z1. The light-blocking element 150i is specifically a lens barrel and includes a light-blocking portion 151i, and the light-blocking portion 151i is disposed closer to the optical axis z1 than a portion 152i of the light-blocking element 150i other than the light-blocking portion 151i to the optical axis z1.

Furthermore, the imaging lens module may further include a plurality of monomer structures (not shown in drawings), which are disposed on at least one of the light-blocking portions 151f, 151g, 151h, 151i. The monomer structures are disposed on the object side of the image surface 180, and each of the monomer structures is extended along a direction parallel to the optical axis z1. In FIG. 7, the object side refers to the left side of the reference element in the figure, and the image side refers to the right side of the reference element in the figure.

In detail, the light-blocking portions 151f, 151g, 151h, 151i face the object side of the optical lens assembly 140f. The light-blocking elements 150f, 150g, 150h, 150i are extended along the direction parallel to the optical axis z1. Furthermore, the monomer structures may face the object side of the optical lens assembly 140f. The cover member 110 corresponds to and faces the light-blocking portions 151f, 151g, 151h, 151i.

In addition, for other details of the 6th example of the 1st embodiment, the related contents of the aforementioned 1st embodiment with FIG. 1A to FIG. 1E may be referred.

1st Example of 2nd Embodiment

Figure 8A:
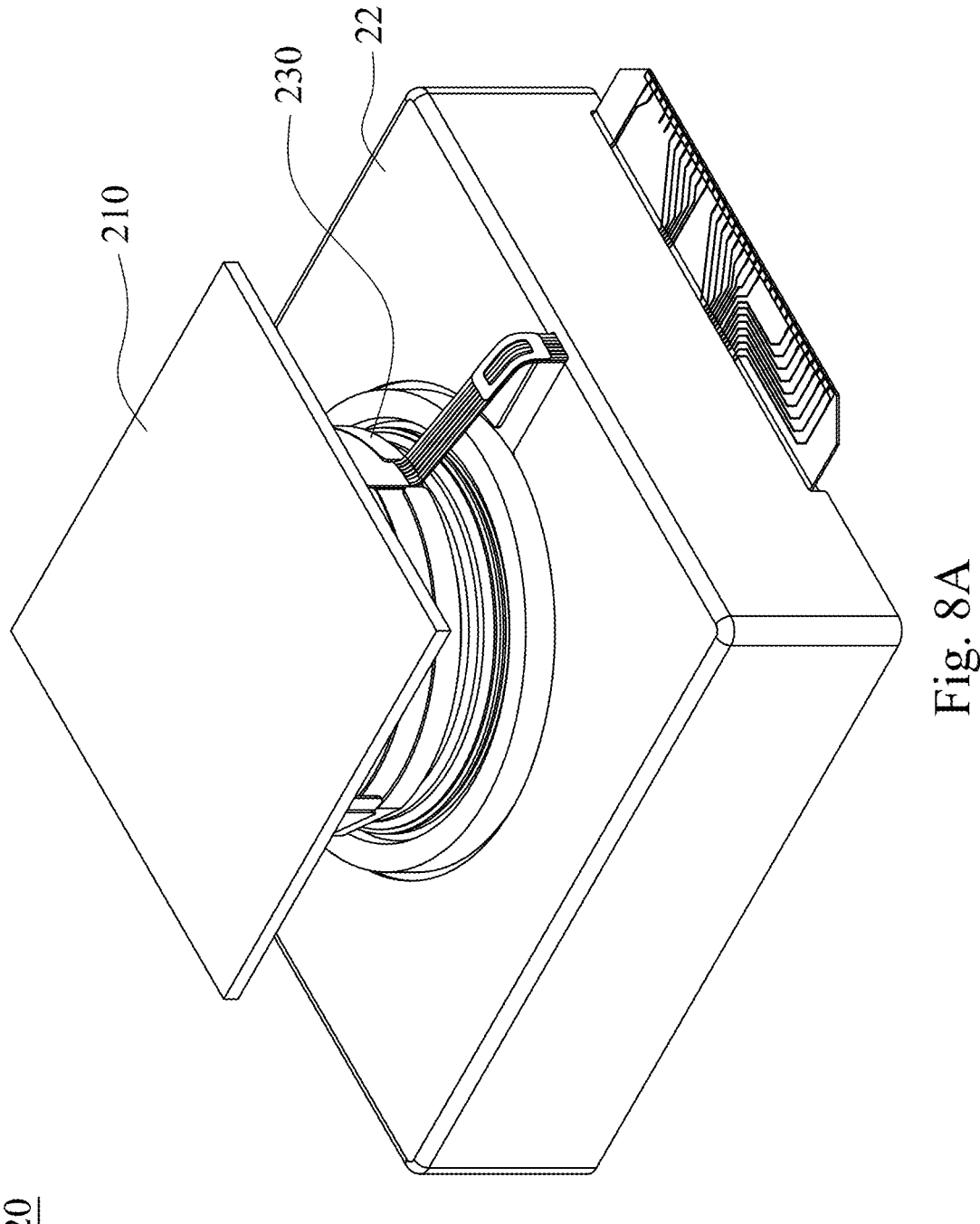
FIG. 8A is a three-dimensional view of a camera module according to the 1st example of the 2nd embodiment of the present disclosure.
Figure 8B:
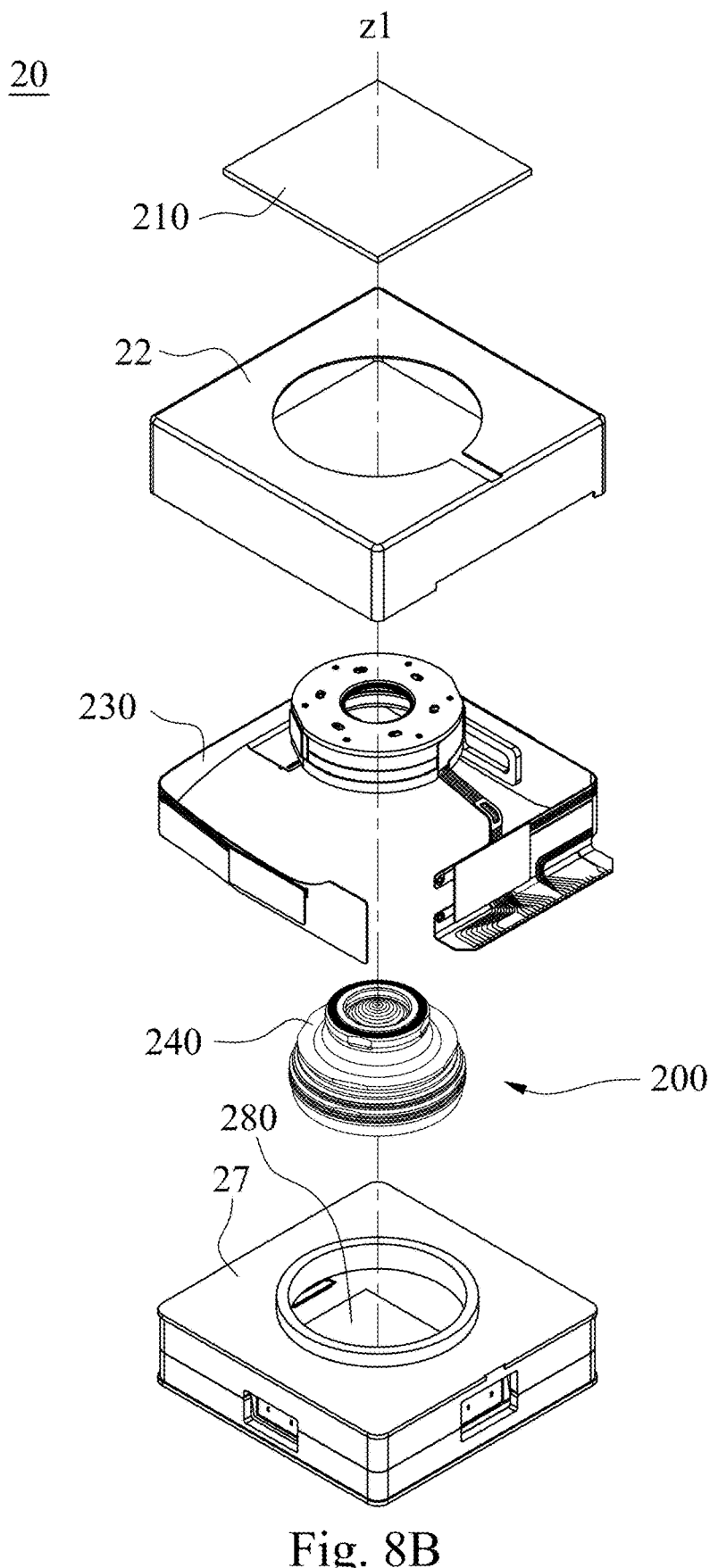
FIG. 8B is an exploded view of the camera module of the 1st example of the 2nd embodiment in FIG. 8A.

FIG. 8A is a three-dimensional view of a camera module 20 according to the 1st example of the 2nd embodiment of the present disclosure, and FIG. 8B is an exploded view of the camera module 20 of the 1st example of the 2nd embodiment in FIG. 8A. With reference to FIG. 8A and FIG. 8B, the camera module 20 includes an imaging lens module 200. Specifically, the camera module 20 may further include a metal yoke 22 and a carrier 27.

Figure 8C:
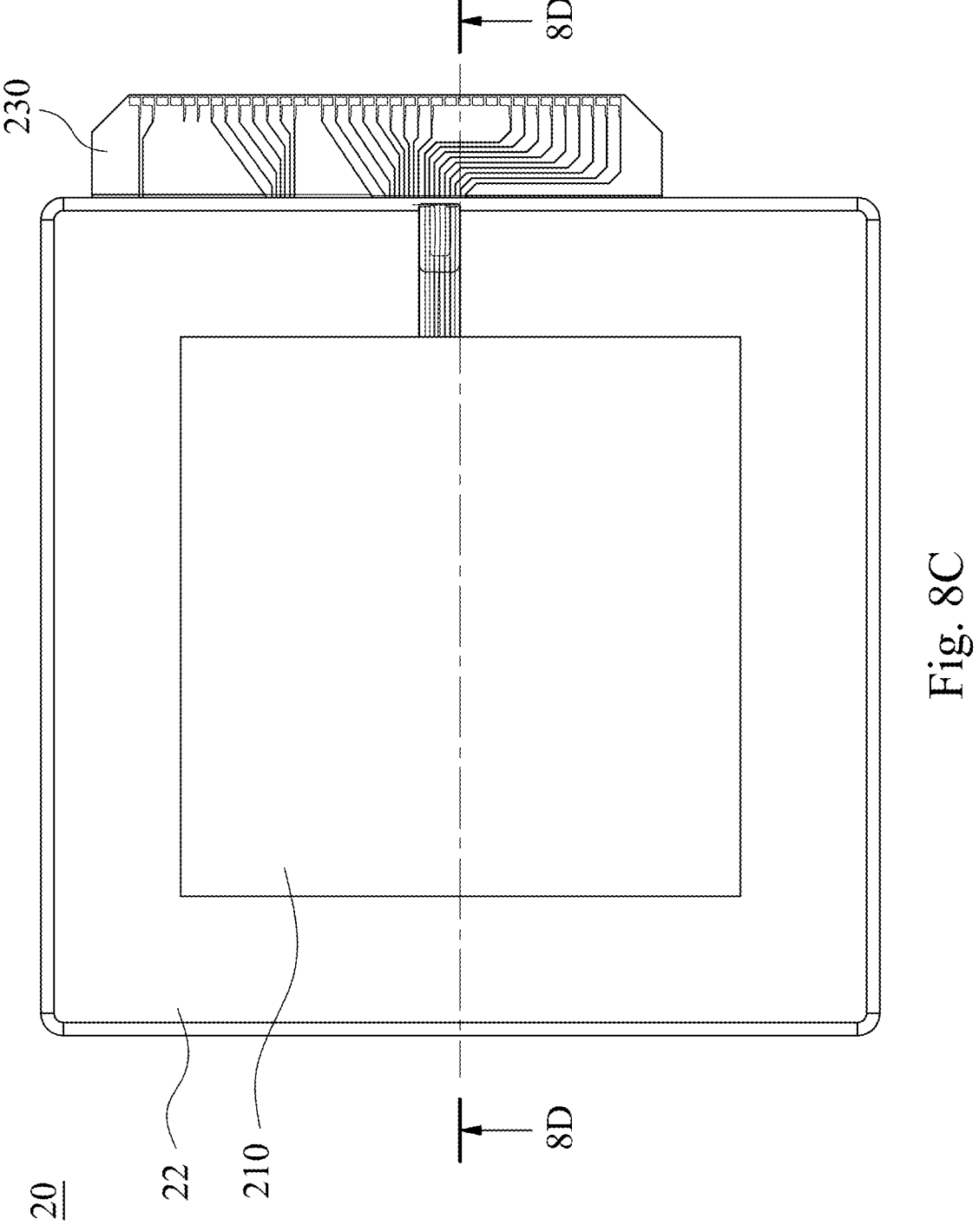
FIG. 8C is a top view of the camera module of the 1st example of the 2nd embodiment in FIG. 8A.
Figure 8D:
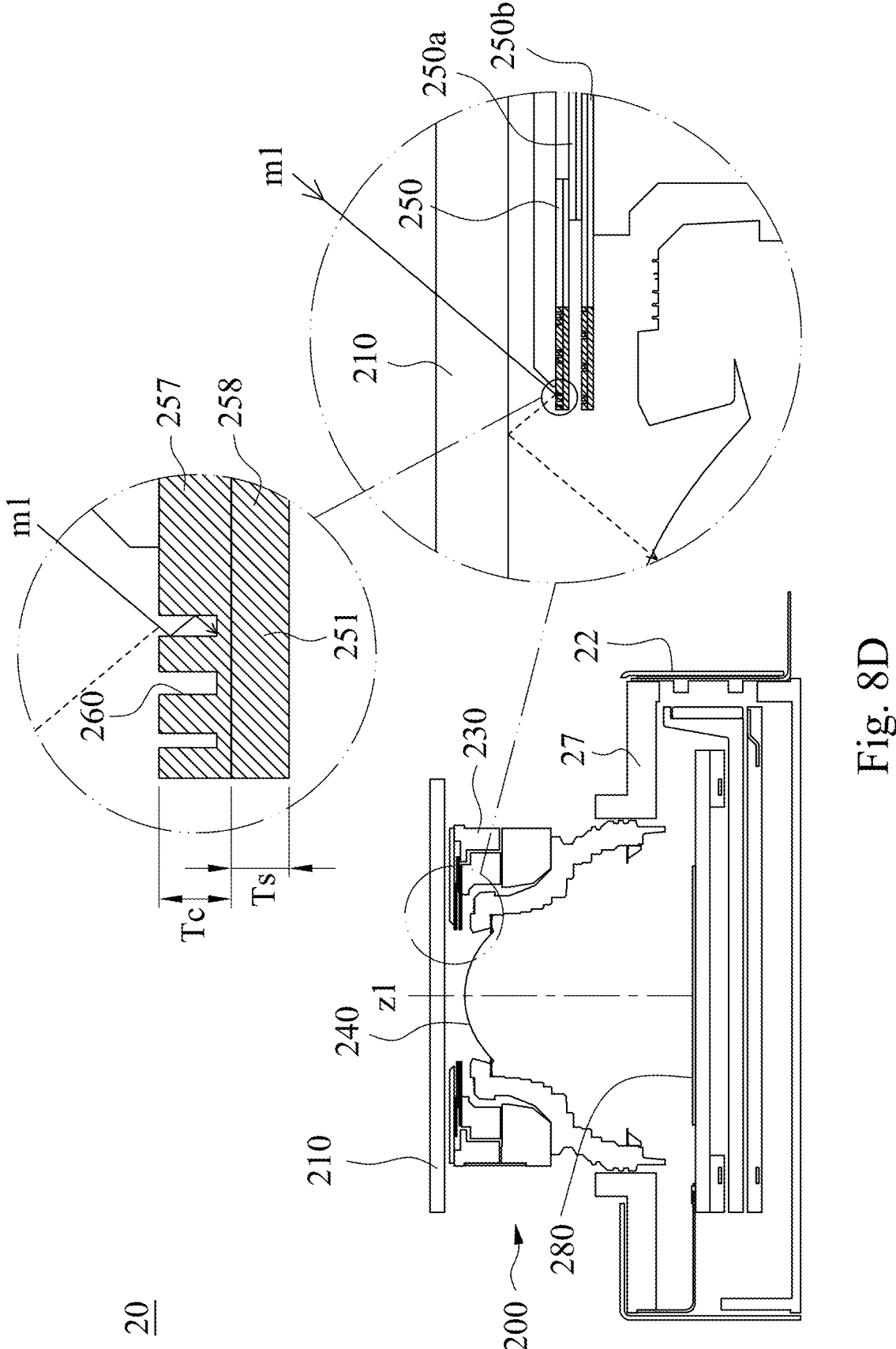
FIG. 8D is a cross-sectional view along line 8D-8D in FIG. 8C.
Figure 8E:
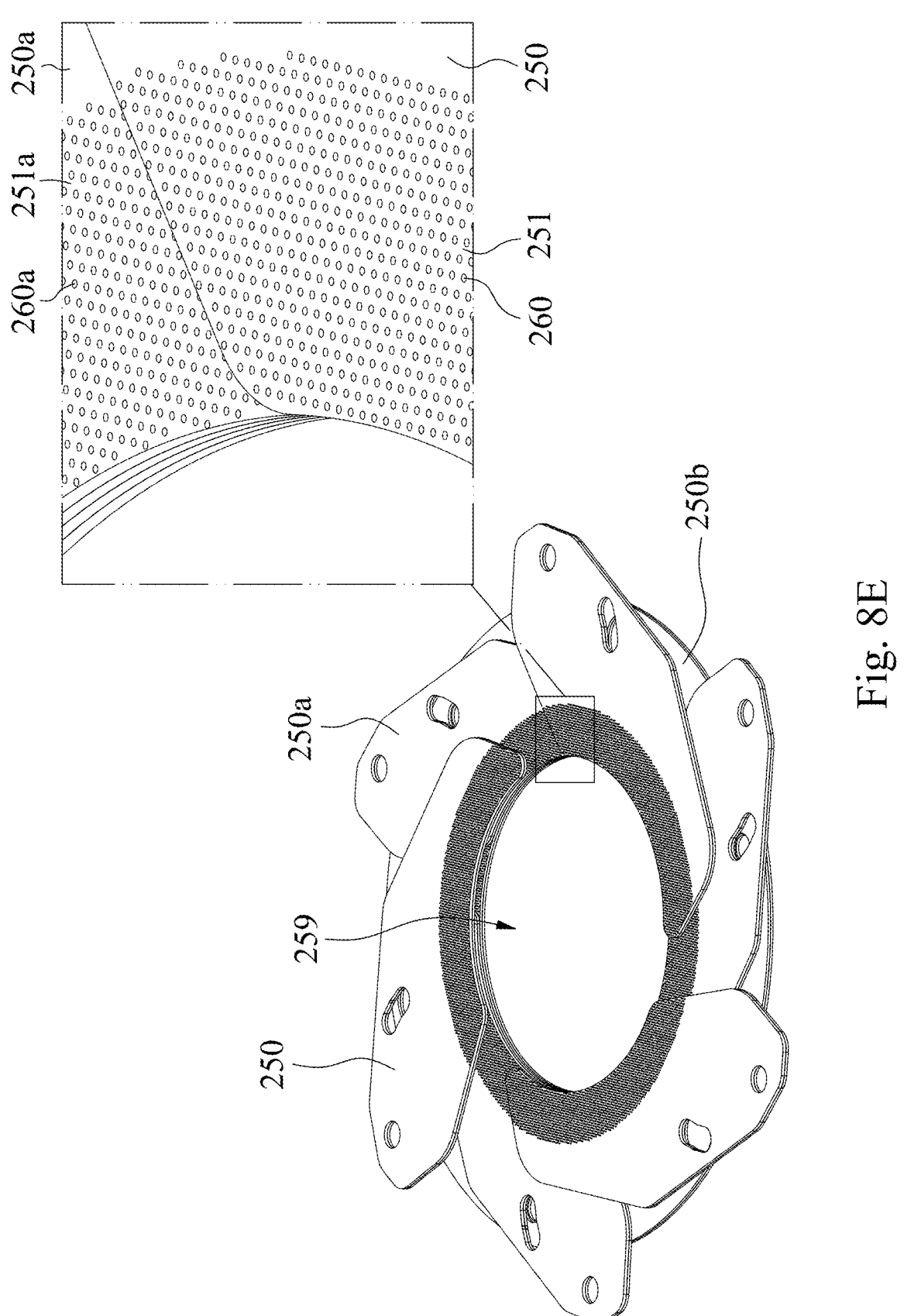
FIG. 8E is a schematic view of light-blocking elements of the camera module of the 1st example of the 2nd embodiment in FIG. 8D.
Figure 8F:
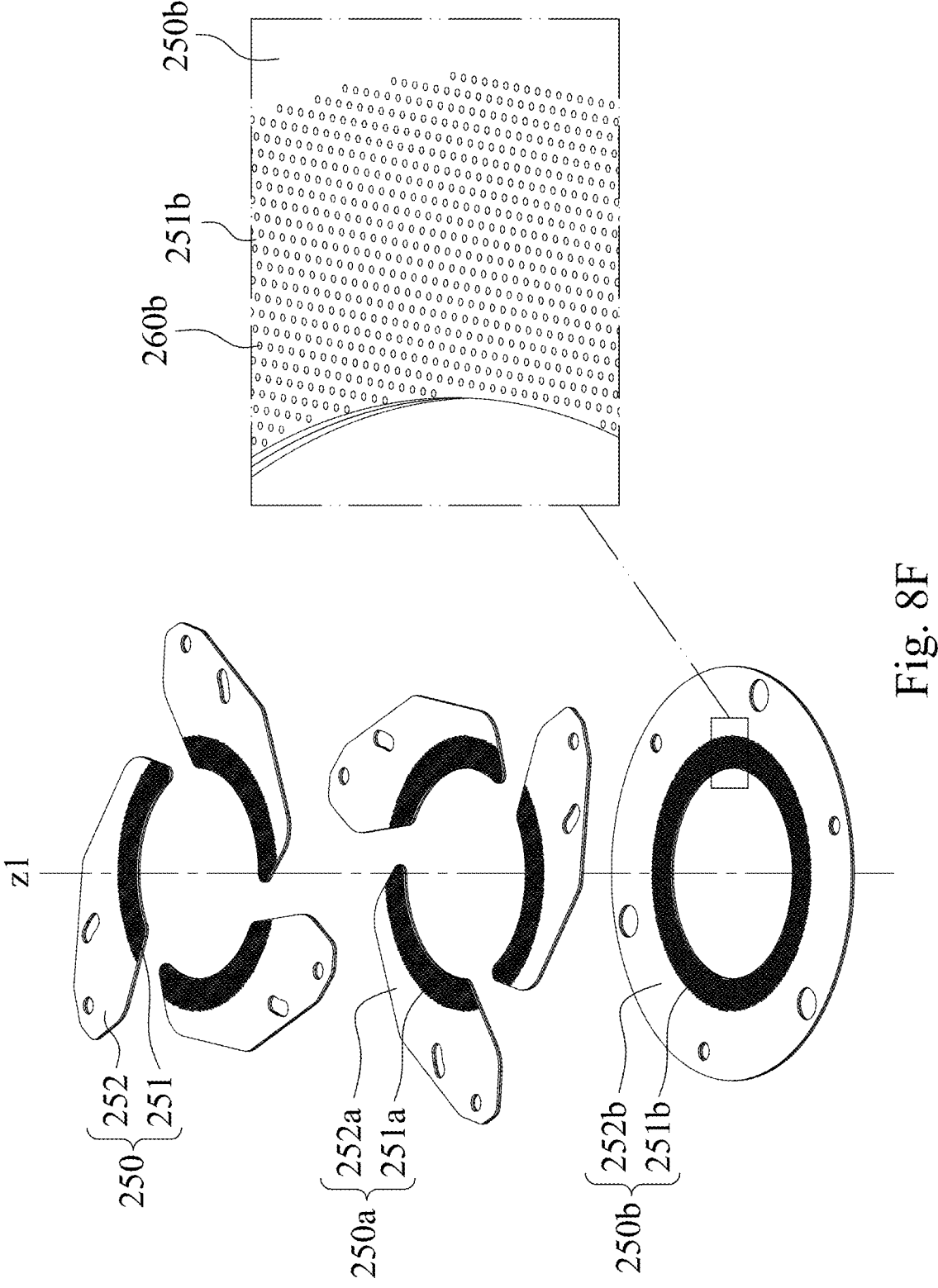
FIG. 8F is an exploded view of the light-blocking elements in FIG. 8E.
Figure 8G:
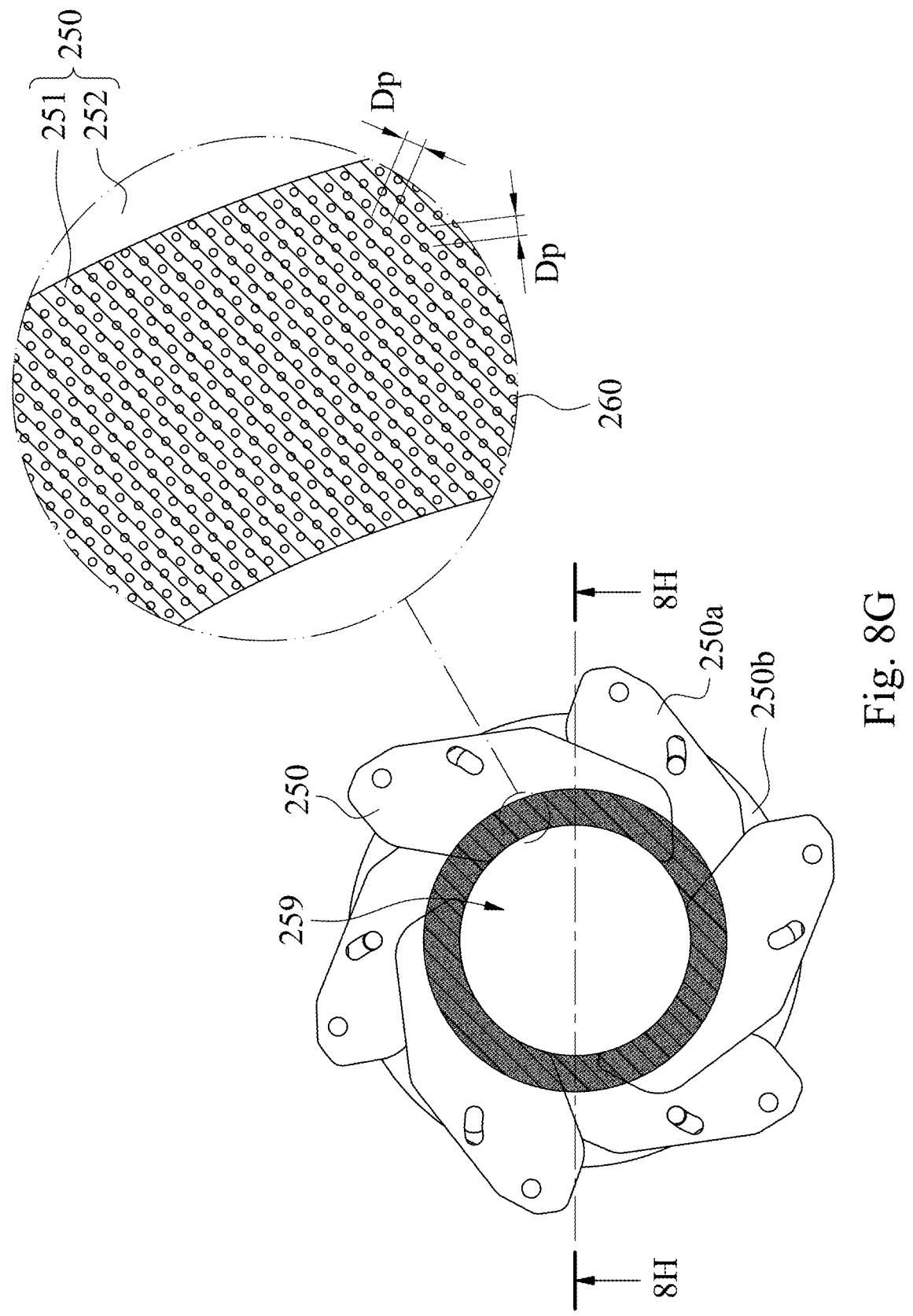
FIG. 8G is a top view of the light-blocking elements in FIG. 8E.

FIG. 8C is a top view of the camera module 20 of the 1st example of the 2nd embodiment in FIG. 8A, FIG. 8D is a cross-sectional view along line 8D-8D in FIG. 8C, FIG. 8E is a schematic view of light-blocking elements 250, 250a, 250b of the camera module 20 of the 1st example of the 2nd embodiment in FIG. 8D, and FIG. 8F is an exploded view of the light-blocking elements 250, 250a, 250b in FIG. 8E. With reference to FIG. 8A to FIG. 8F, the imaging lens module 200 has an image surface 280, and an image sensor (not labeled) is disposed on the image surface 280. The imaging lens module 200 includes an optical lens assembly 240, at least one light-blocking element (the light-blocking elements 250, 250a, 250b, specifically), a plurality of monomer structures 260, 260a, 260b and a cover member 210. The optical lens assembly 240 is disposed on an object side of the image surface 280 and defines an optical axis z1.

Specifically, the imaging lens module 200 may further include a variable aperture module 230, which is disposed on the object side of the optical lens assembly 240, and the optical axis z1 passes through the center of the variable aperture module 230. The variable aperture module 230 includes the light-blocking elements 250, 250a, 250b. The light-blocking elements 250, 250a, 250b are stacked on each other along a circumferential direction around the optical axis z1 to form a variable light aperture 259 (as shown in FIG. 8E), and the present disclosure is not limited thereto.

With reference to FIG. 8D and FIG. 8F, each of the light-blocking elements 250, 250a, 250b is specifically a light-blocking sheet. A number of the light-blocking elements 250 is three, a number of the light-blocking elements 250a is three, and a number of the light-blocking element 250b being annular-shaped is one. The light-blocking element 250 is disposed opposite to the optical lens assembly 240 and includes a light-blocking portion 251, and the light-blocking portion 251 is disposed closer to the optical axis z1 than a portion 252 of the light-blocking element 250 other than the light-blocking portion 251 to the optical axis z1. The light-blocking element 250a is disposed opposite to the optical lens assembly 240 and includes a light-blocking portion 251a, and the light-blocking portion 251a is disposed closer to the optical axis z1 than a portion 252a of the light-blocking element 250a other than the light-blocking portion 251a to the optical axis z1. The light-blocking element 250b is disposed opposite to the optical lens assembly 240 and includes a light-blocking portion 251b, and the light-blocking portion 251b is disposed closer to the optical axis z1 than a portion 252b of the light-blocking element 250b other than the light-blocking portion 251b to the optical axis z1.

With reference to FIG. 8D to FIG. 8G, the monomer structures 260 are disposed on the light-blocking portion 251 of the light-blocking element 250, the monomer structures 260a are disposed on the light-blocking portion 251a of the light-blocking element 250a, and the monomer structures 260b are disposed on the light-blocking portion 251b of the light-blocking element 250b. The monomer structures 260, 260a, 260b are disposed on the object side of the image surface 280, and each monomer structure of the monomer structures 260, 260a, 260b is extended along a direction parallel to the optical axis z1. Each monomer structure of the monomer structures 260, 260a, 260b appears as a concave columnar structure recessed with a depth from a disposing surface of the corresponding one of the light-blocking portions 251, 251a, 251b toward another surface. In other embodiments/examples according to the present disclosure, each of the monomer structures may appear as a convex columnar structure protruding with a height from a disposing surface of the light-blocking portion, but is not limited thereto. The cover member 210 is disposed on an object side of the optical lens assembly 240, and the optical axis z1 passes through the cover member 210. Therefore, the monomer structures 260, 260a, 260b are advantageous in destroying the reflection path of the non-imaging light and preventing the non-imaging light from entering the optical lens assembly 240. For example, in FIG. 8D, the incident light m1 is prevented from being reflected from the light-blocking portion 251 to the cover member 210 and then being reflected from the cover member 210 into of the lens elements of the optical lens assembly 240, as the light path shown by the dotted line, thereby obtaining a clearer image. In FIG. 8A, FIG. 8B, FIG. 8D to FIG. 8F and FIG. 8H, the object side refers to the upper side of the reference element in the figure, and the image side refers to the lower side of the reference element in the figure.

In detail, with reference to FIG. 8D to FIG. 8F, the light-blocking portions 251, 251a, 251b may face the object side of the optical lens assembly 240. The light-blocking elements 250, 250a, 250b may be extended along the direction parallel to the optical axis z1. Furthermore, the monomer structures 260, 260a, 260b may face the object side of the optical lens assembly 240. The cover member 210 may correspond to and face the light-blocking portions 251, 251a, 251b of the light-blocking elements 250, 250a, 250b, respectively.

Each of the light-blocking elements 250, 250a, 250b may be made of at least two structural layers. The at least two structural layers may include a base layer and a covering layer, e.g., the light-blocking element 250 includes a base layer 258 and a covering layer 257, and the light-blocking element 250b includes a base layer 258b and a covering layer 257b. Specifically, each of the light-blocking elements 250, 250a, 250b may be a light-blocking sheet, but is not limited thereto.

Figure 8H:
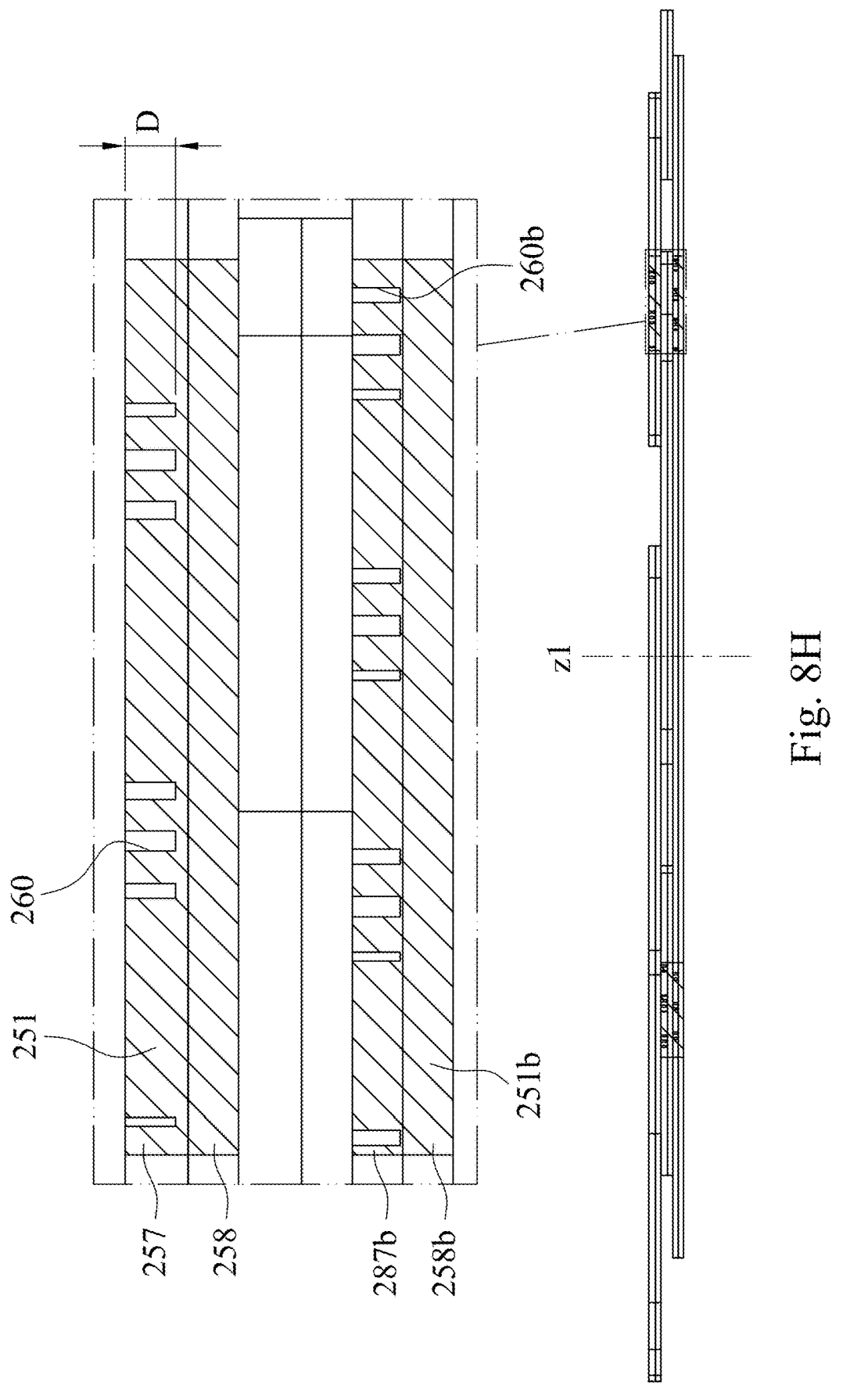
FIG. 8H is a cross-sectional view along line 8H-8H in FIG. 8G.

In FIG. 8D and FIG. 8F to FIG. 8H, a spacing distance between adjacent two of the monomer structures 260 is Dp, a length along the direction parallel to the optical axis z1 of each of the monomer structures 260 is D, a number of the monomer structures 260 on the light-blocking portion 251 is Nm1, a number of the monomer structures 260a on the light-blocking portion 251a is Nm2, a number of the monomer structures 260b on the light-blocking portion 251b is Nm3, a sum of the numbers of the monomer structures 260, 260a, 260b is Nm, and the values of the above parameters are listed in the following Table 6. Furthermore, as shown in FIG. 8D and FIG. 8H, when a thickness of the base layer 258 is Ts, and a thickness of the covering layer 257 is Tc, the following condition may be satisfied: 0.03 mm≤D<Ts+Tc<0.5 mm.

TABLE 6

| 1st Example of 2nd Embodiment | | | |
| --- | --- | --- | --- |
| Dp (mm) | 0.04 | Nm2 | 2253 |
| D (mm) | 0.04 | Nm3 | 8322 |
| Nm1 | 2253 | Nm | 21840 |

3rd Embodiment

Figure 9A:
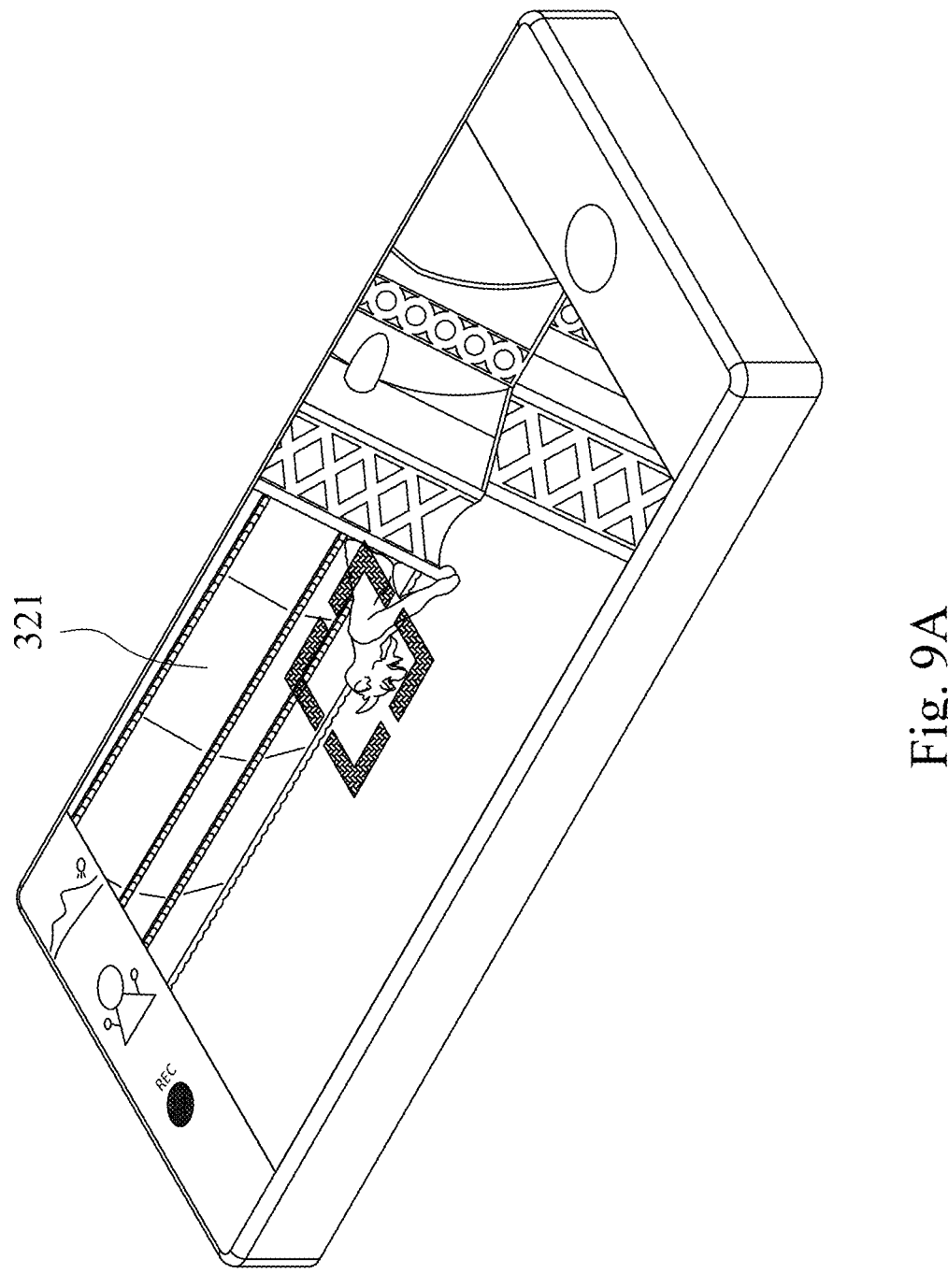
FIG. 9A is a schematic view of an electronic device according to the 3rd embodiment of the present disclosure.
Figure 9B:
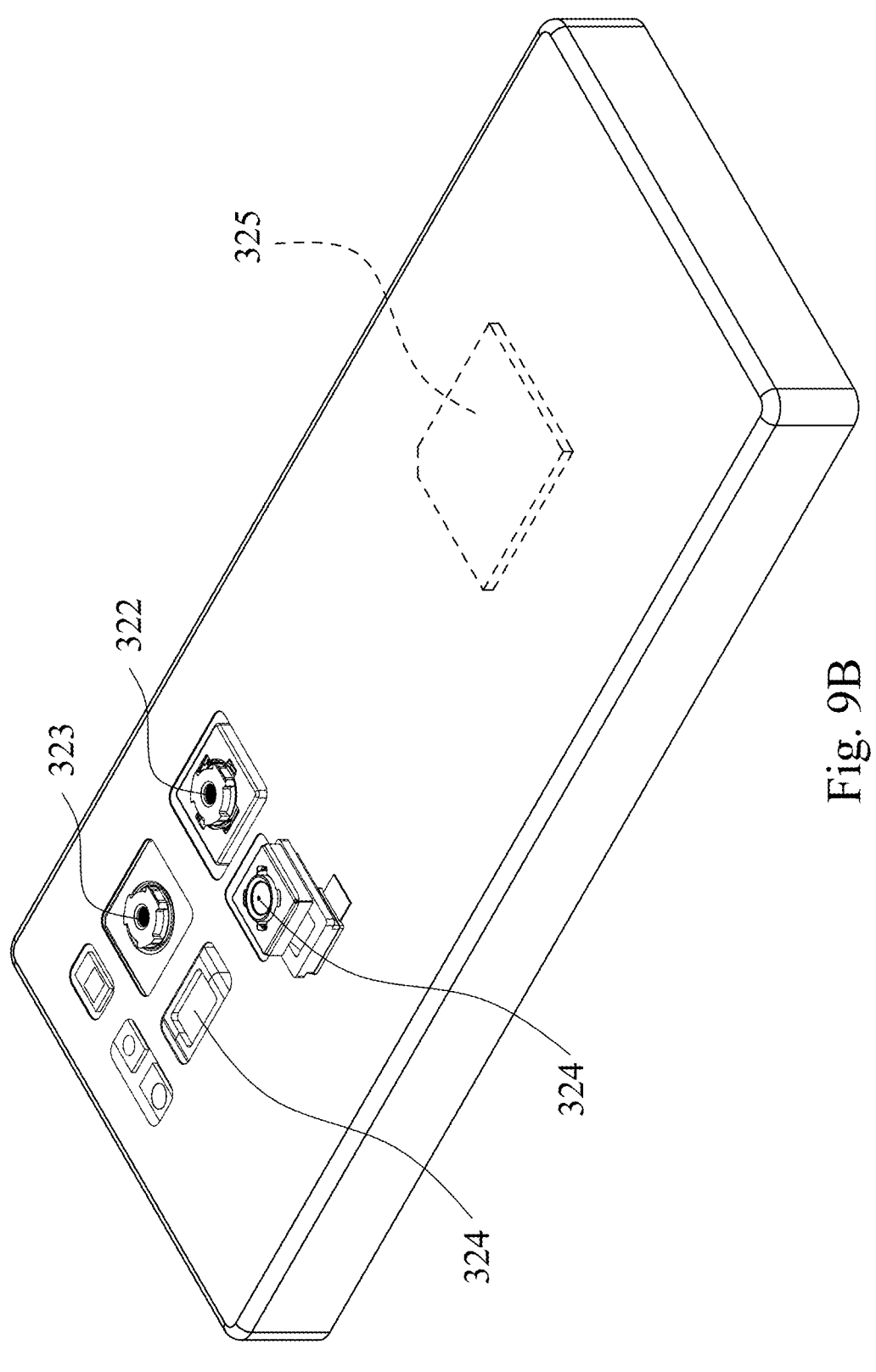
FIG. 9B is another schematic view of the electronic device according to the 3rd embodiment in FIG. 9A.

FIG. 9A is a schematic view of an electronic device 30 according to the 3rd embodiment of the present disclosure. FIG. 9B is another schematic view of the electronic device 30 according to the 3rd embodiment in FIG. 9A. In FIG. 9A and FIG. 9B, the electronic device 30 is a smart phone, the electronic device 30 can have the wireless communication function, the electronic device 30 includes a camera module of the present disclosure, and the camera module includes an imaging lens module and may include an image sensor, wherein the image sensor is disposed on an image surface of the imaging lens module, and the image sensor is configured to receive an imaging light of the imaging lens module. Moreover, the camera modules can be an ultra-wide angle camera module 322, a high resolution camera module 323 and telephoto camera modules 324, and the user interface 321 is a touch screen, but the present disclosure is not limited thereto. In particular, the camera modules can be the camera modules according to the aforementioned 1st and the 2nd embodiments, but the present disclosure is not limited thereto.

The user interface 321 has the touch function, and users can enter a shooting mode via the user interface 321, wherein the user interface 321 is configured to display the scene, and the shooting angle can be manually adjusted to switch the ultra-wide angle camera module 322, the high resolution camera module 323 and the telephoto camera modules 324. At this moment, the imaging light is gathered on the image sensor via the camera module, and an electronic signal about an image is output to an image signal processor (ISP) 325.

In FIG. 9B, to meet a specification of the electronic device 30, the electronic device 30 can further include an optical anti-shake mechanism (not shown). Furthermore, the electronic device 30 can further include at least one focusing assisting module (its reference numeral is omitted) and at least one sensing element (not shown). The focusing assisting module can be a flash module for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 30 equipped with an auto-focusing mechanism and the optical anti-shake mechanism can be enhanced to achieve the superior image quality. Furthermore, the electronic device 30 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 321 and manually operate the view finding range on the user interface 321 to achieve the autofocus function of what you see is what you get.

Moreover, the imaging lens module, the optical anti-shake mechanism, the sensing element and the focusing assisting module can be disposed on a flexible printed circuit board (FPC) (not shown) and electrically connected to the associated components, such as the image signal processor 325, via a connector (not shown) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 3rd embodiment, the electronic device 30 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 325, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 30 can further include, but not be limited to, a display, a control unit, a storage unit, a random access memory (RAM), a read-only memory (ROM), or the combination thereof.

Figure 9C:
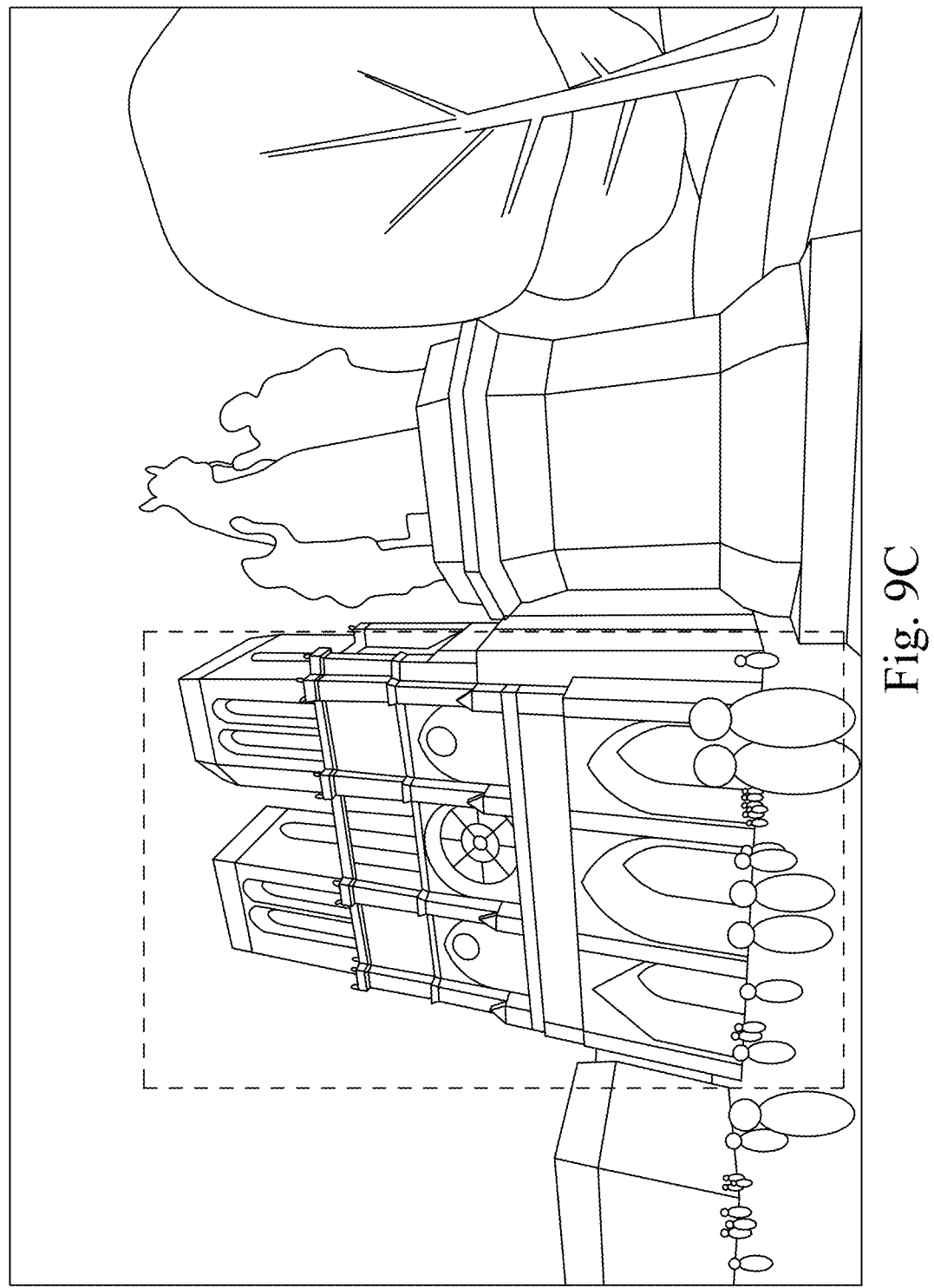
FIG. 9C is a schematic view of an image captured via the electronic device according to the 3rd embodiment in FIG. 9B.

FIG. 9C is a schematic view of an image captured via the electronic device 30 according to the 3rd embodiment in FIG. 9B. In FIG. 9C, the larger range of the image can be captured via the ultra-wide angle camera module 322, and the ultra-wide angle camera module 322 has the function of accommodating wider range of the scene.

Figure 9D:
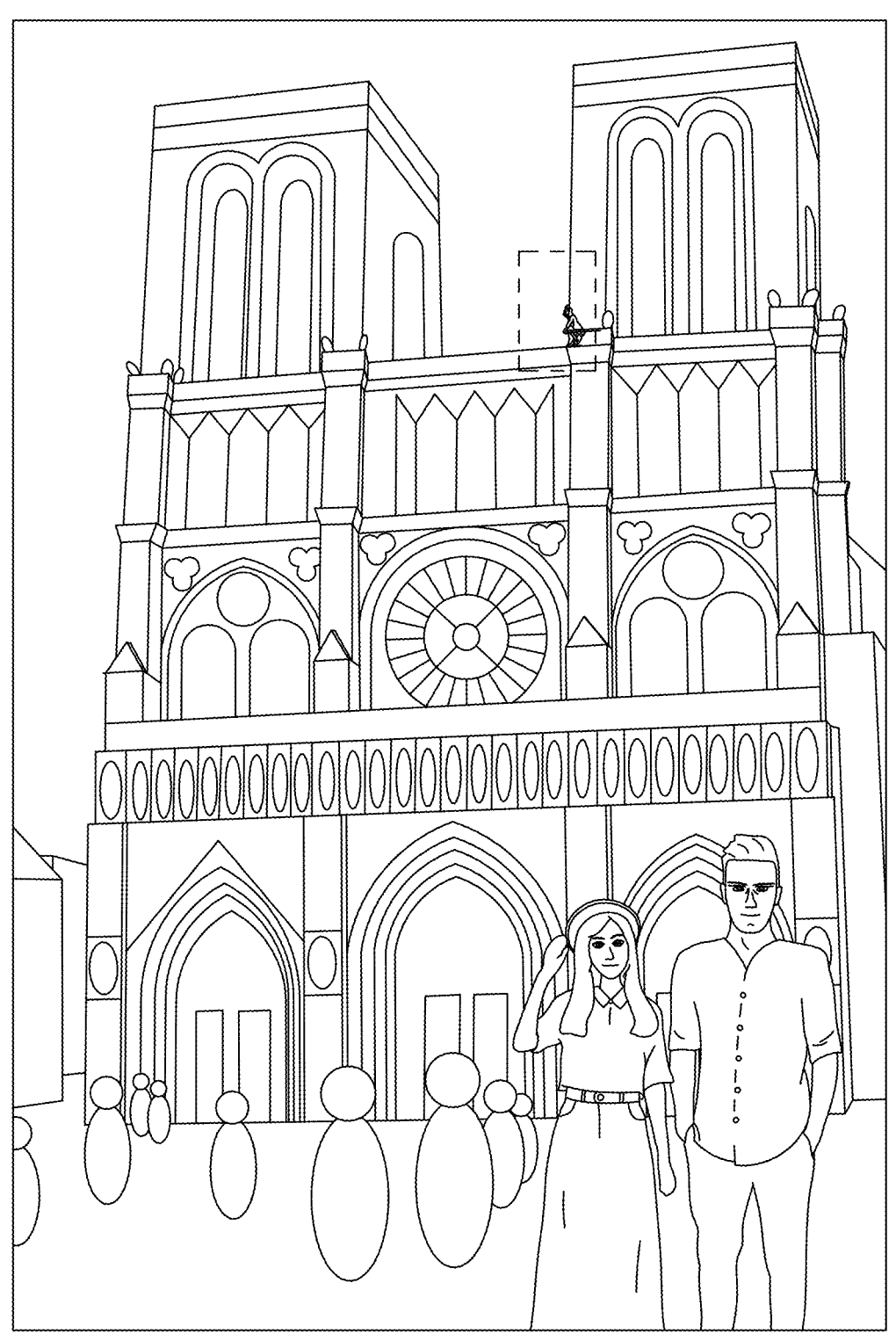
FIG. 9D is another schematic view of an image captured via the electronic device according to the 3rd embodiment in FIG. 9B.

FIG. 9D is another schematic view of an image captured via the electronic device 30 according to the 3rd embodiment in FIG. 9B. In FIG. 9D, the image of the certain range with the high resolution can be captured via the high resolution camera module 323, and the high resolution camera module 323 has the function of the high resolution and the low deformation.

Figure 9E:
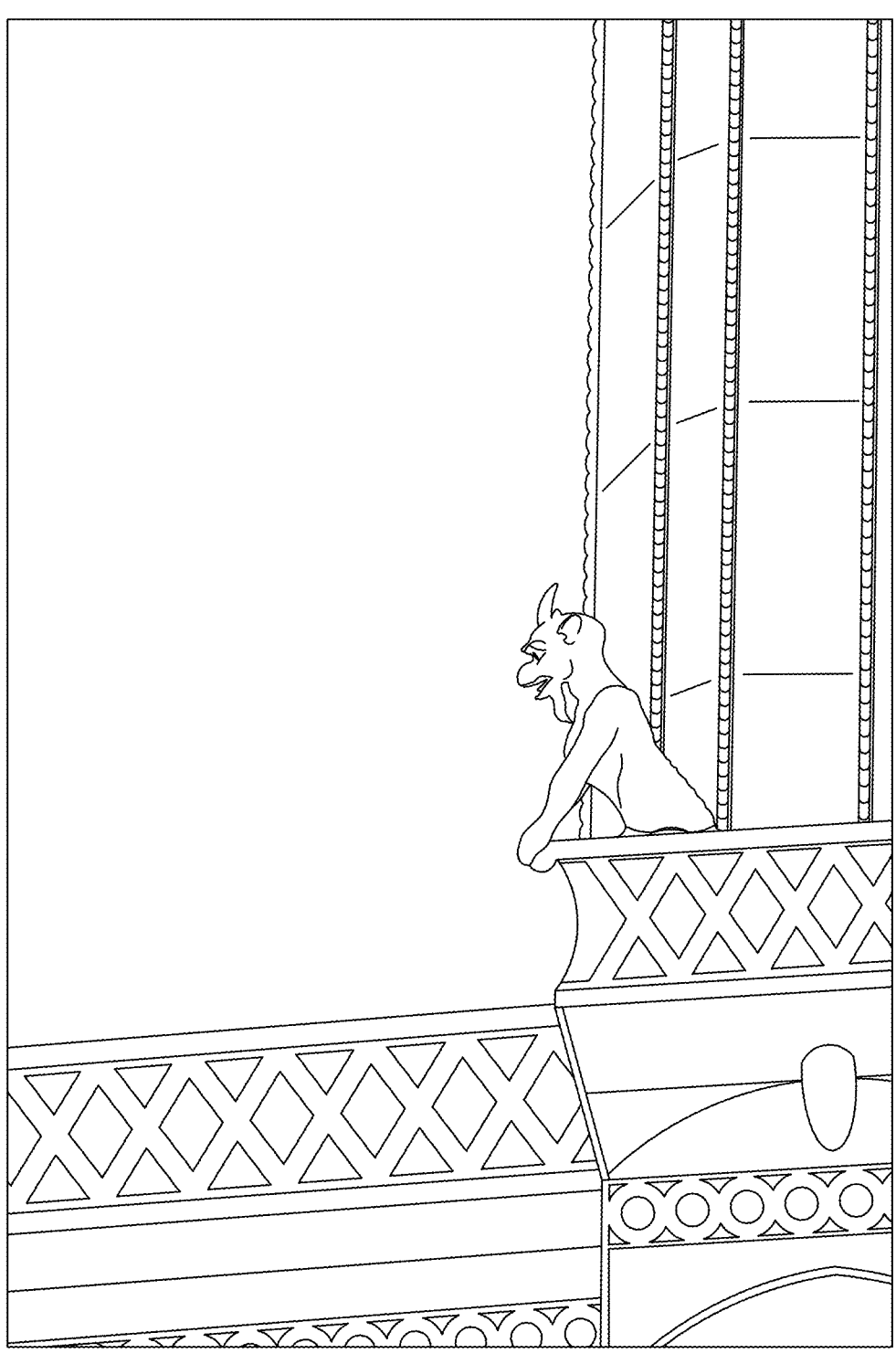
FIG. 9E is another schematic view of an image captured via the electronic device according to the 3rd embodiment in FIG. 9B.

FIG. 9E is another schematic view of an image captured via the electronic device 30 according to the 3rd embodiment in FIG. 9B. In FIG. 9E, each of the telephoto camera modules 324 has the enlarging function of the high magnification, and the distant image can be captured and enlarged with high magnification via the telephoto camera modules 324.

In FIG. 9C to FIG. 9E, the zooming function can be obtained via the electronic device 30, when the scene is captured via the camera modules with different focal lengths cooperated with the function of image processing.

4th Embodiment

Figure 10:
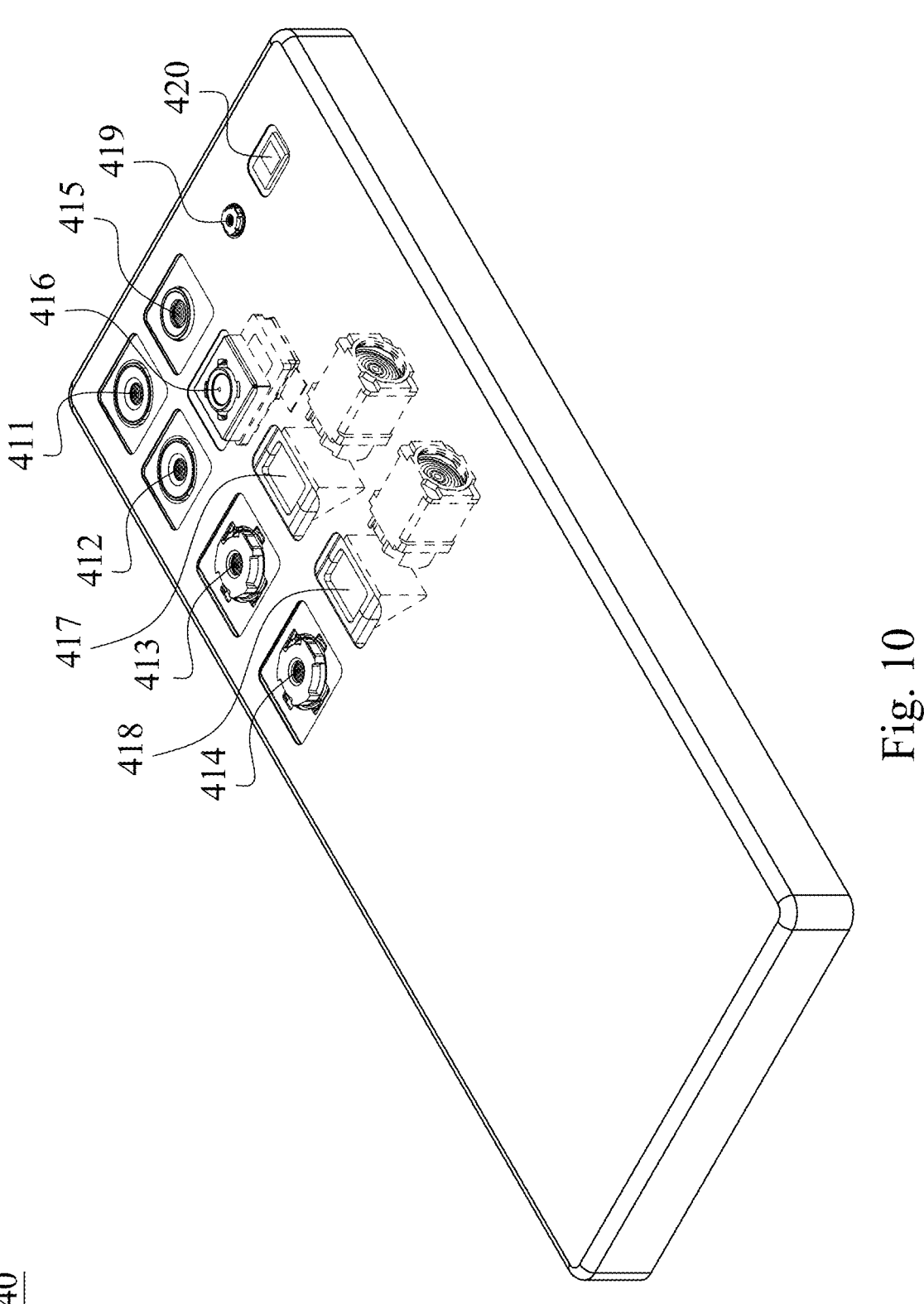
FIG. 10 is a schematic view of an electronic device according to the 4th embodiment of the present disclosure.

FIG. 10 is a schematic view of an electronic device 40 according to the 4th embodiment of the present disclosure. In FIG. 10, the electronic device 40 is a smart phone, the electronic device 40 includes a camera module of the present disclosure, and the camera module includes an imaging lens module and may include an image sensor, wherein the image sensor is disposed on an image surface of the imaging lens module, and the image sensor is configured to receive an imaging light of the imaging lens module. Moreover, the camera modules can be ultra-wide angle camera modules 411, 412, wide angle camera modules 413, 414, telephoto camera modules 415, 416, 417, 418 and a Time-Of-Flight (TOF) module 419. The TOF module 419 can be another type of the camera module, and the disposition is not limited thereto. In particular, the camera modules can be the camera modules according to the aforementioned 1st and the 2nd embodiments, but the present disclosure is not limited thereto.

Further, the telephoto camera modules 417, 418 are configured to fold the light, but the present disclosure is not limited thereto.

To meet a specification of the camera module of the electronic device 40, the electronic device 40 can further include an optical anti-shake mechanism (not shown). Furthermore, the electronic device 40 can further include at least one focusing assisting module (not shown) and at least one sensing element (not shown). The focusing assisting module can be a flash module 420 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 40 equipped with an autofocusing mechanism and the optical anti-shake mechanism can be enhanced to achieve the superior image quality. Furthermore, the electronic device 40 according to the present disclosure can have a capturing function with multiple modes, such as taking optimized selfies, High Dynamic Range (HDR) under a low light condition, 4K Resolution recording and so on.

Further, all of other structures and dispositions according to the 4th embodiment are the same as the structures and the dispositions according to the 3rd embodiment, and will not be described again herein.

5th Embodiment

Figure 11A:
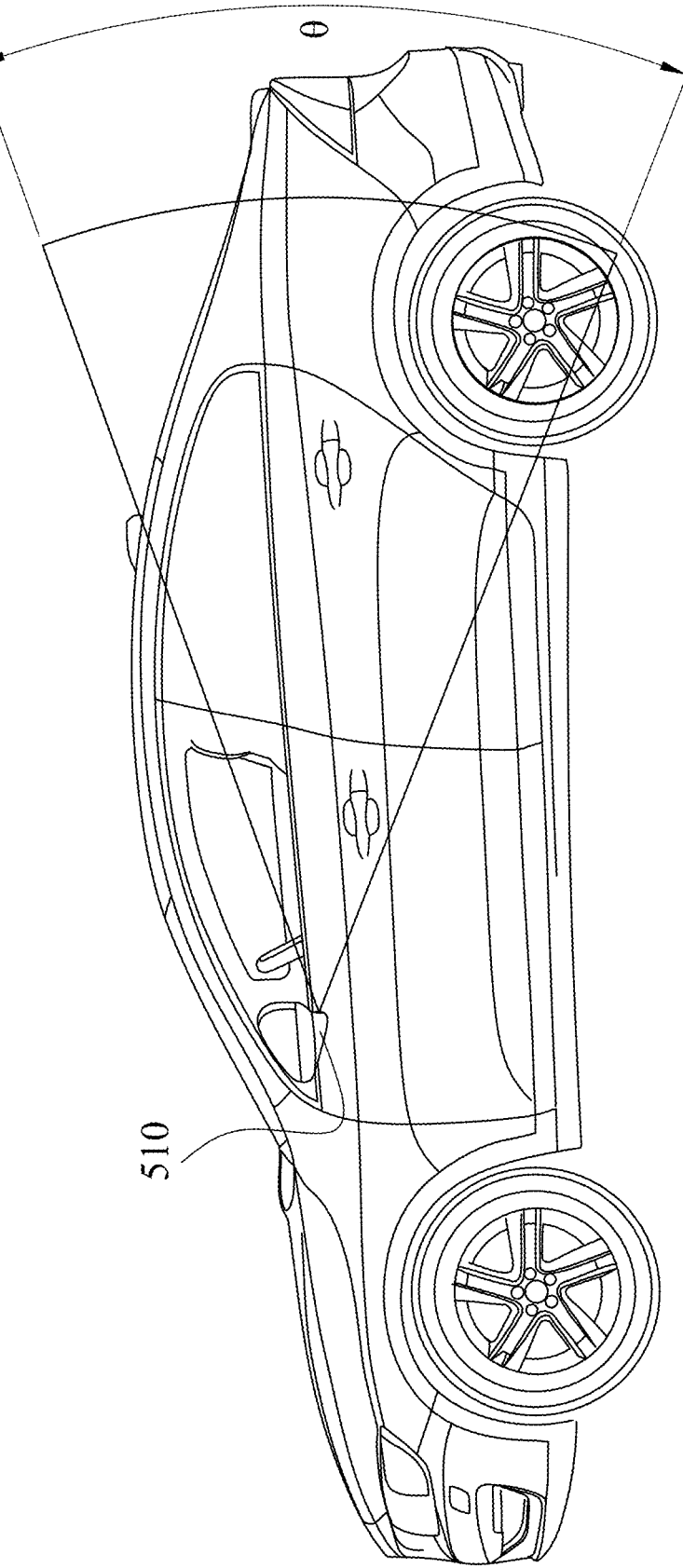
FIG. 11A is a schematic view of a vehicle instrument according to the 5th embodiment of the present disclosure.
Figure 11B:
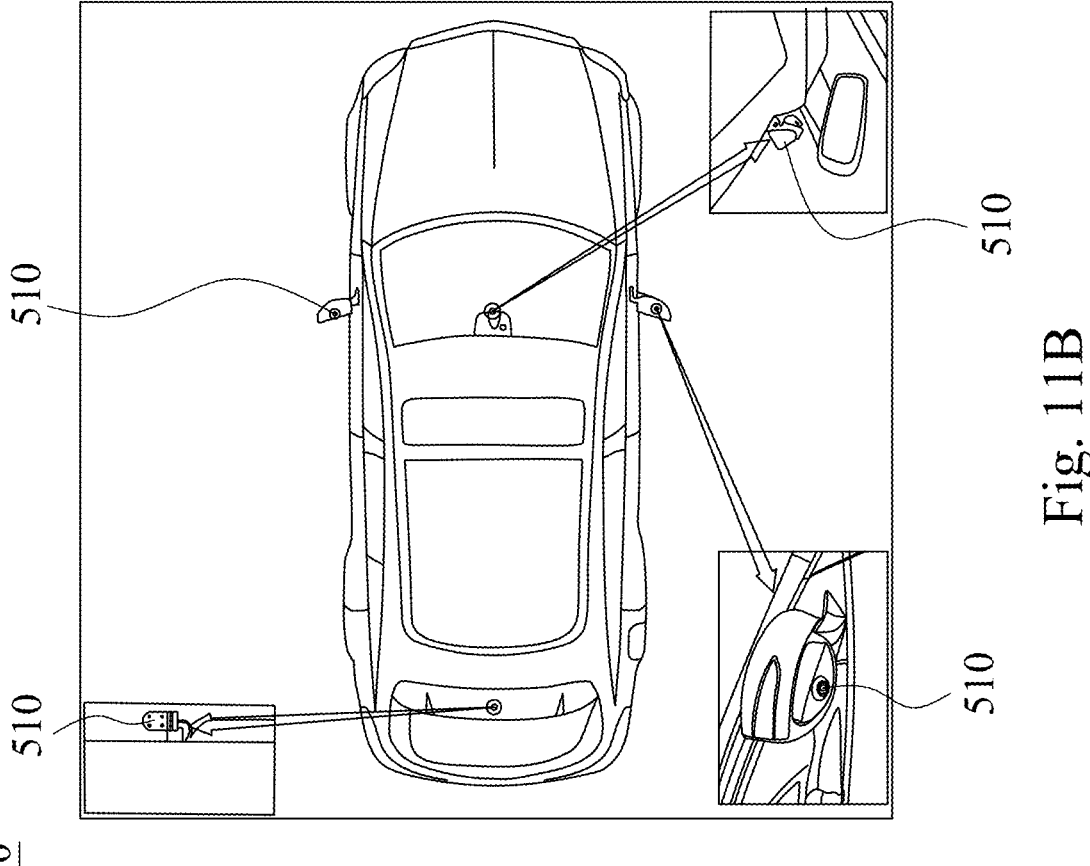
FIG. 11B is another schematic view of the vehicle instrument according to the 5th embodiment in FIG. 11A.
Figure 11C:
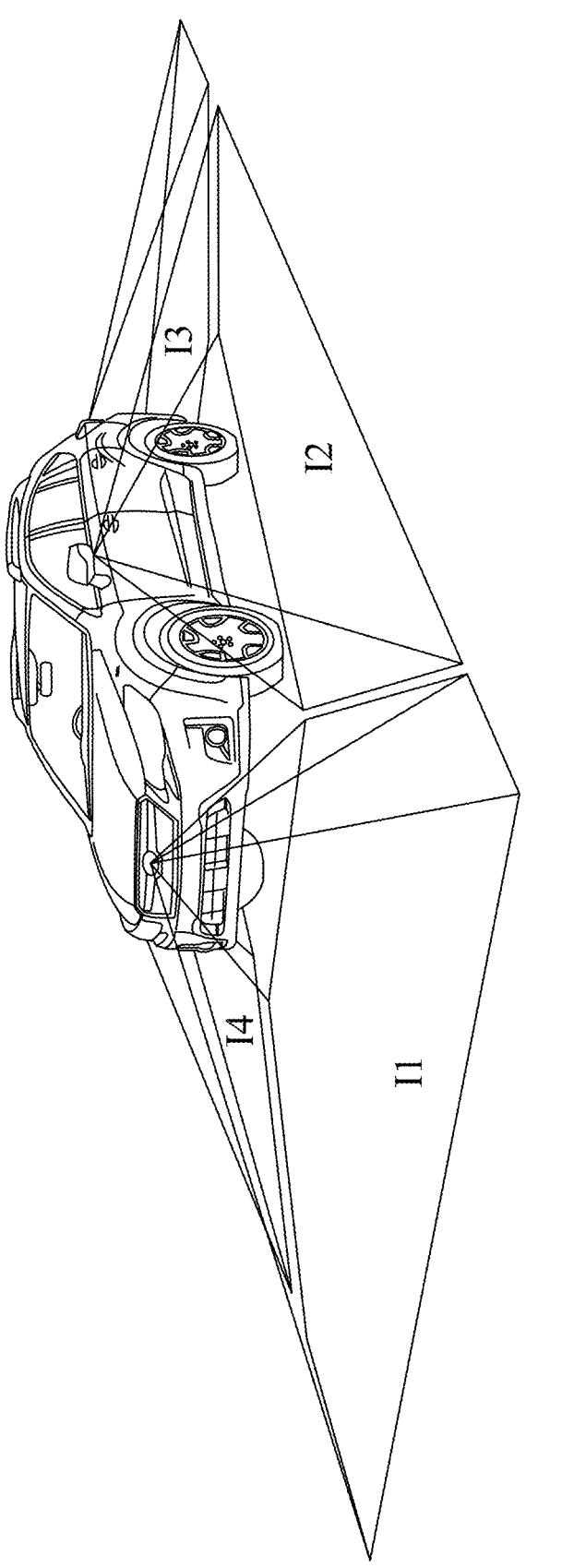
FIG. 11C is another schematic view of the vehicle instrument according to the 5th embodiment in FIG. 11A.

FIG. 11A is a schematic view of a vehicle instrument 50 according to the 5th embodiment of the present disclosure. FIG. 11B is another schematic view of the vehicle instrument 50 according to the 5th embodiment in FIG. 11A. FIG. 11C is another schematic view of the vehicle instrument 50 according to the 5th embodiment in FIG. 11A. In FIG. 11A to FIG. 11C, an electronic device (its reference numeral is omitted) is applied to the vehicle instrument 50, the electronic device includes a camera module 510 of the present disclosure, and the camera module includes an imaging lens module of the present disclosure. According to the 5th embodiment, a number of the camera modules 510 is six, the camera modules 510 are automotive camera modules, and the camera modules 510 can be the camera modules according to the aforementioned 1st and 2nd embodiments, but the present disclosure is not limited thereto.

In FIG. 11A and FIG. 11B, two of the camera modules 510 are located under rearview mirrors on a left side and a right side, respectively, and the aforementioned camera modules 510 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 11B, another two of the camera modules 510 can be disposed in the inner space of the vehicle instrument 50. In particular, the aforementioned two camera modules 510 are disposed on a location close to the rearview mirror inside the vehicle instrument 50 and a location close to the rear car window, respectively. Moreover, the camera modules 510 can be further disposed on the rearview mirrors of the vehicle instrument 50 on the left side and the right side except the mirror surface, respectively, but the present disclosure is not limited thereto.

In FIG. 11C, another two of the camera modules 510 can be disposed on a front end of the vehicle instrument 50 and a rear end of the vehicle instrument 50, respectively. By disposing the camera modules 510 on the front end and the rear end of the vehicle instrument 50 and under the rearview mirror on the left side of the vehicle instrument 50 and the right side of the vehicle instrument 50, it is favorable for the drivers obtaining the external space information in addition to the driving seat, such as the external space informations 11, 12, 13, 14, but the present disclosure is not limited thereto. Therefore, more visual angles can be provided to reduce the blind spot, so that the driving safety can be improved. Further, the traffic information outside of the vehicle instrument 50 can be recognized by disposing the camera modules 510 on the periphery of the vehicle instrument 50, so that the function of the automatic driving assistance can be achieved.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, having an image surface, and comprising:
an optical lens assembly disposed on an object side of the image surface and defining an optical axis, wherein the optical lens assembly comprises:
a light-blocking element comprising a light-blocking portion, wherein the light-blocking portion is disposed closer to the optical axis than a portion of the light-blocking element other than the light-blocking portion thereto;
a plurality of monomer structures disposed on the object side of the image surface, wherein each of the monomer structures is extended along a direction parallel to the optical axis; and
a cover member disposed on an object side of the optical lens assembly, wherein the optical axis passes through the cover member;
wherein the monomer structures are disposed on the light-blocking portion of the light-blocking element;
wherein a length along the direction parallel to the optical axis of each of the monomer structures is D, a spacing distance between adjacent two of the monomer structures is Dp, and the following conditions are satisfied:

$$0.03 \text{ mm} \le D < 0.12 \text{ mm}; \quad \text{and}$$

$$0.02 \text{ mm} \le Dp < 0.095 \text{ mm}.$$

2. The imaging lens module of claim 1, wherein a number of the monomer structures is Nm, and the following condition is satisfied:

$$250 < Nm < 25000.$$

3. The imaging lens module of claim 1, wherein the light-blocking portion faces the object side of the optical lens assembly.

4. The imaging lens module of claim 1, wherein the light-blocking element is extended along the direction parallel to the optical axis.

5. The imaging lens module of claim 4, wherein the light-blocking element further comprises an object-side surface, which is located at a most object-side portion of the light-blocking element.

6. The imaging lens module of claim 5, wherein a height difference along the direction parallel to the optical axis between the object-side surface and a disposing surface of the monomer structures is ΔH, a length along the direction parallel to the optical axis of the light-blocking element is Lb, and the following condition is satisfied:

$$0 \leq \Delta H / Lb < 0.8.$$

7. The imaging lens module of claim 5, wherein the object-side surface faces the object side of the optical lens assembly.

8. The imaging lens module of claim 1, wherein the monomer structures face the object side of the optical lens assembly.

9. The imaging lens module of claim 1, wherein the cover member corresponds to and faces the light-blocking portion of the light-blocking element.

10. A camera module, comprising:
the imaging lens module of claim 1.

11. An electronic device, comprising:
the camera module of claim 10.

12. An imaging lens module, having an image surface, and comprising:
an optical lens assembly disposed on an object side of the image surface and defining an optical axis;
a light-blocking element disposed opposite to the optical lens assembly and comprising a light-blocking portion, wherein the light-blocking portion is disposed closer to the optical axis than a portion of the light-blocking element other than the light-blocking portion thereto;

a plurality of monomer structures disposed on the object side of the image surface, wherein each of the monomer structures is extended along a direction parallel to the optical axis; and
a cover member disposed on an object side of the optical lens assembly, wherein the optical axis passes through the cover member;
wherein the monomer structures are disposed on the light-blocking portion of the light-blocking element;
wherein a length along the direction parallel to the optical axis of each of the monomer structures is D, a spacing distance between adjacent two of the monomer structures is Dp, and the following conditions are satisfied:

$$0.03 \text{ mm} \leq D < 0.12 \text{ mm}; \text{ and}$$

$$0.02 \text{ mm} \leq Dp < 0.095 \text{ mm}.$$

13. The imaging lens module of claim 12, wherein a number of the monomer structures is Nm, and the following condition is satisfied:

$$250 < Nm < 25000.$$

14. The imaging lens module of claim 12, wherein the light-blocking portion faces the object side of the optical lens assembly.

15. The imaging lens module of claim 12, wherein the light-blocking element is made of at least two structural layers.

16. The imaging lens module of claim 15, wherein the at least two structural layers comprise a base layer and a covering layer.

17. The imaging lens module of claim 16, wherein a thickness of the base layer is Ts, a thickness of the covering layer is Tc, and the following condition is satisfied:

$$0.03 \text{ mm} \leq D < Ts + Tc < 0.5 \text{ mm}.$$

18. The imaging lens module of claim 12, wherein the monomer structures face the object side of the optical lens assembly.

19. The imaging lens module of claim 12, wherein the cover member corresponds to and faces the light-blocking portion of the light-blocking element.

\* \* \* \* \*